US012769587B2

(12) United States Patent
Gill et al.

(10) Patent No.: US 12,769,587 B2
(45) Date of Patent: Oct. 20, 2026

(54) WORKLOAD-INTENT-BASED LCS RESOURCE CAPABILITY CONFIGURATION SYSTEM

(71) Applicant: Dell Products L.P., Round Rock, TX (US)

(72) Inventors: Joshua Gill, Apex, NC (US); Ethan A. Kaley, North Kingstown, RI (US); Andrea Restle-Lay, Raleigh, NC (US); Sanne Bloemsma, Cedar Park, TX (US); Douglas Lang Farley, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 412 days.

(21) Appl. No.: 18/392,624

(22) Filed: Dec. 21, 2023

(65) Prior Publication Data

US 2025/0208923 A1 Jun. 26, 2025

(51) Int. Cl.

| | |
|---|---|
| ***G06F 9/50*** | (2006.01) |
| ***G06F 9/4401*** | (2018.01) |
| ***G06F 21/60*** | (2013.01) |
| ***G06F 21/62*** | (2013.01) |

(52) U.S. Cl.

CPC ............ *G06F 9/505* (2013.01); *G06F 9/4411* (2013.01); *G06F 9/5044* (2013.01); *G06F 9/5055* (2013.01); *G06F 9/5072* (2013.01); *G06F 9/5077* (2013.01); *G06F 21/604* (2013.01); *G06F 21/62* (2013.01)

(58) Field of Classification Search

None

See application file for complete search history.

(56) References Cited

U.S. PATENT DOCUMENTS

| | | | | |
|---|---|---|---|---|
| 8,589,866 | B2 | 11/2013 | Sekine et al. | |
| 2024/0211155 | A1* | 6/2024 | Pabón | G06F 3/0604 |
| 2024/0211156 | A1* | 6/2024 | Pabón | G06F 21/6218 |
| 2024/0211172 | A1* | 6/2024 | Pabón | G06F 3/067 |
| 2024/0211178 | A1* | 6/2024 | Pabón | G06F 3/067 |
| 2024/0211276 | A1* | 6/2024 | Vohra | G06F 9/4411 |
| 2024/0289038 | A1* | 8/2024 | Pabón | G06F 3/0635 |

FOREIGN PATENT DOCUMENTS

WO WO-2024137412 A1 * 6/2024 ......... G06F 9/45558

* cited by examiner

*Primary Examiner* — Qing Yuan Wu

(74) *Attorney, Agent, or Firm* — Joseph Mencher

(57) ABSTRACT

A workload-intent-based LCS resource capability configuration system includes a resource management system coupled to resource devices. The resource management system receives a request to provide an LCS that includes workload intent identifying requirements of a workload the LCS will perform, and identifies a subset of the resource devices for providing the LCS to perform the workload. The resource management system then determines resource capabilities required from the subset of the resource devices to satisfy the workload intent, determines driver(s) required for the subset of the resource devices, and provides configuration information for driver(s) that is configured to limit driver-enabled capabilities available from the driver(s) for the subset of the resource devices to the resource capabilities required from the subset of the resource devices to satisfy the workload intent. The resource management system then provides the driver(s) for the subset of the resource devices.

20 Claims, 15 Drawing Sheets

WORKLOAD-INTENT-BASED LCS RESOURCE CAPABILITY CONFIGURATION SYSTEM

BACKGROUND

The present disclosure relates generally to information handling systems, and more particularly to configuring resource capabilities for a Logically Composed System (LCS) provided by information handling systems based on a workload intent for that LCS.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and their components, may be used to provide Logically Composed Systems (LCSs) to users that include logical systems whose functionality is provided by components in one or more server devices. However, the enablement of functionality from components for an LCS requires the provisioning of corresponding drivers, which can raise some issues. For example, for a storage component used to provide an LCS, a Container Storage Interface (CSI) driver may be provided for that storage component in order to expose block and file storage systems to containerized workloads provided using the KUBERNETES® container orchestration system. However, conventional drivers used with components to provide LCSs operate to expose all the capabilities available from the component for which they are provided, including capabilities that are not utilized with their LCS to perform its workload, capabilities that can introduce security issues and attack vectors, and/or other driver-enabled LCS component capabilities that can introduce other issues known in the art.

Accordingly, it would be desirable to provide an LCS component capability configuration system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a resource management engine that is configured to: receive a request to provide a Logically Composed System (LCS) that includes workload intent identifying requirements of a workload that the LCS will perform; identify a subset of a plurality of resource devices that are coupled to the processing system for providing the LCS to perform the workload; determine resource capabilities required from the subset of the plurality of resource devices to satisfy the workload intent; determine at least one driver required for the subset of the plurality of resource devices; provide configuration information for the at least one driver that is configured to limit driver-enabled capabilities available from the at least one driver for the subset of the plurality of resource devices to the resource capabilities required from the subset of the plurality of resource devices to satisfy the workload intent; and provide the at least one driver for the subset of the plurality of resource devices.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
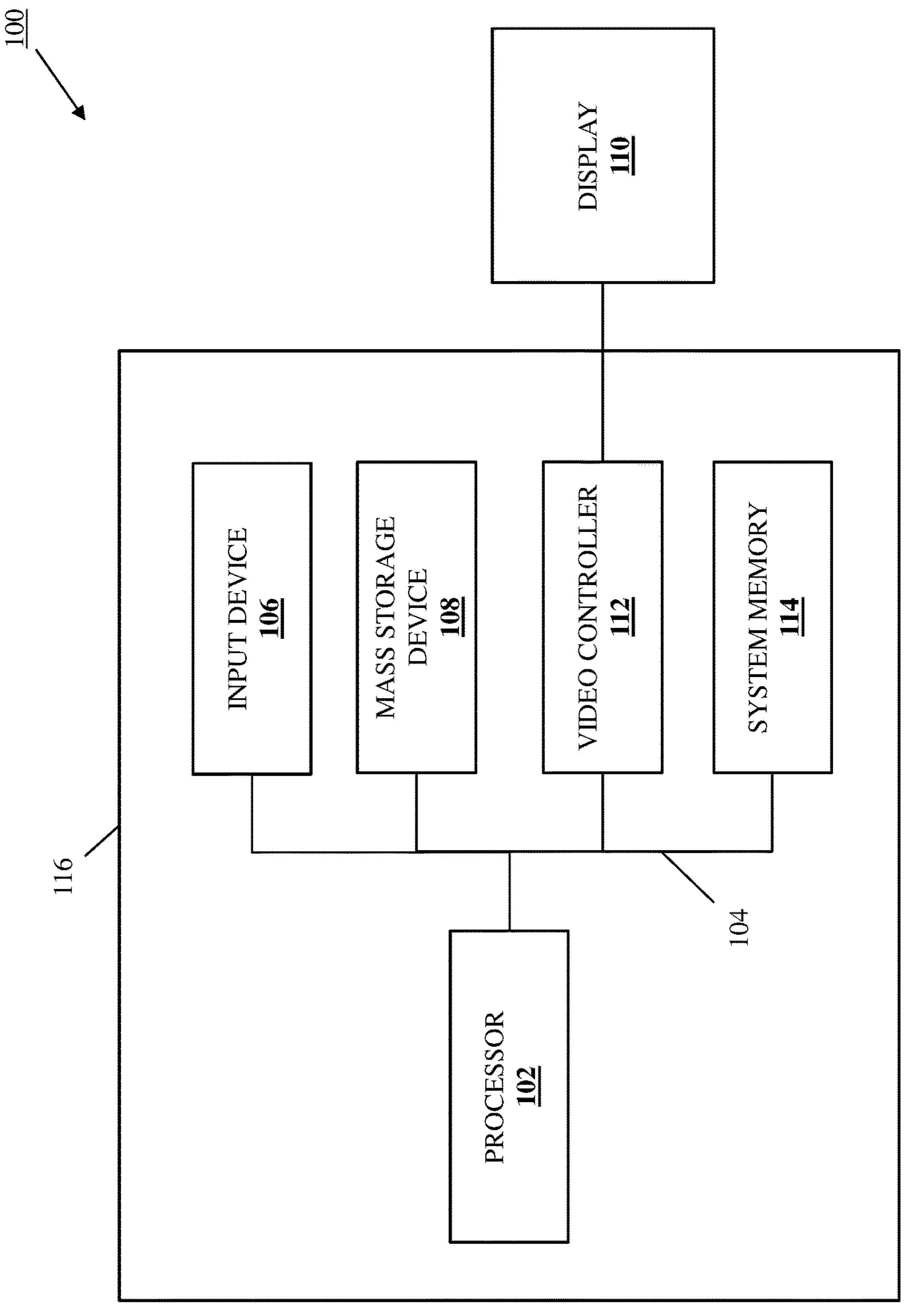
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

As discussed in further detail below, the workload-intent-based Logically Composed System (LCS) resource capability configuration systems and methods of the present disclosure may be utilized with LCSs, which one of skill in the art in possession of the present disclosure will recognize may be provided to users as part of an intent-based, as-a-Service delivery platform that enables multi-cloud computing while keeping the corresponding infrastructure that is utilized to do so "invisible" to the user in order to, for example, simplify the user/workload performance experience. As such, the LCSs discussed herein enable relatively rapid utilization of technology from a relatively broader resource pool, optimize the allocation of resources to workloads to provide improved scalability and efficiency, enable seamless introduction of new technologies and value-add services, and/or provide a variety of other benefits that would be apparent to one of skill in the art in possession of the present disclosure.

Figure 2:
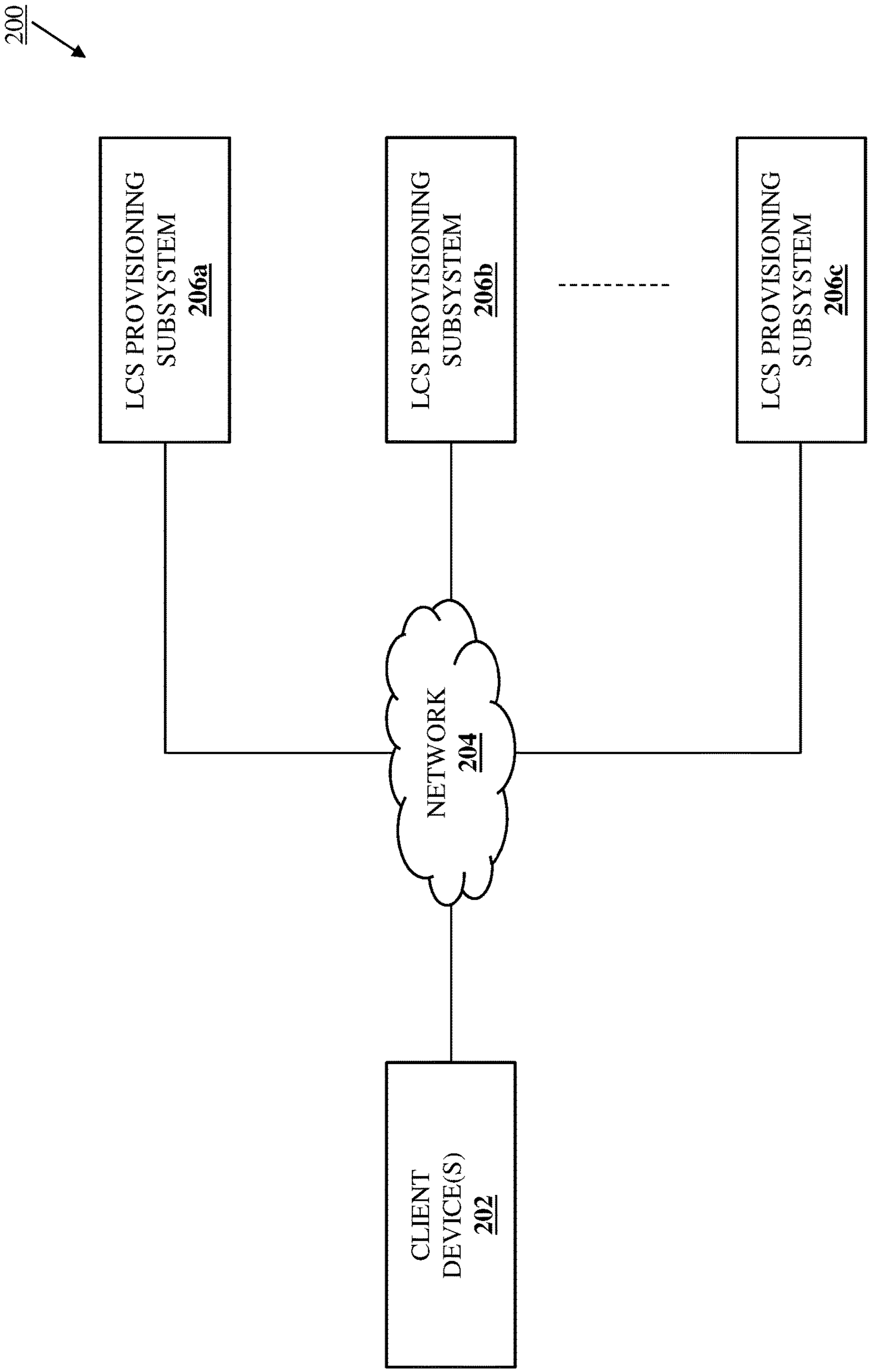
FIG. 2 is a schematic view illustrating an embodiment of an LCS provisioning system.

With reference to FIG. 2, an embodiment of an LCS provisioning system 200 is illustrated that may be utilized with the workload-intent-based LCS resource capability configuration systems and methods of the present disclosure. In the illustrated embodiment, the LCS provisioning system 200 includes one or more client devices 202. In an embodiment, any or all of the client devices may be provided by the IHS 100 discussed above with reference to FIG. 1 and/or may include some or all of the components of the IHS 100, and in specific examples may be provided by desktop computing devices, laptop/notebook computing devices, tablet computing devices, mobile phones, and/or any other computing device known in the art. However, while illustrated and discussed as being provided by specific computing devices, one of skill in the art in possession of the present disclosure will recognize that the functionality of the client device(s) 202 discussed below may be provided by other computing devices that are configured to operate similarly as the client device(s) 202 discussed below, and that one of skill in the art in possession of the present disclosure would recognize as utilizing the LCSs described herein. As illustrated, the client device(s) 202 may be coupled to a network 204 that may be provided by a Local Area Network (LAN), the Internet, combinations thereof, and/or any of network that would be apparent to one of skill in the art in possession of the present disclosure.

As also illustrated in FIG. 2, a plurality of LCS provisioning subsystems 206*a*, 206*b*, and up to 206*c* are coupled to the network 204 such that any or all of those LCS provisioning subsystems 206*a*-206*c* may provide LCSs to the client device(s) 202 as discussed in further detail below. In an embodiment, any or all of the LCS provisioning subsystems 206*a*-206*c* may include one or more of the IHS 100 discussed above with reference to FIG. 1 and/or may include some or all of the components of the IHS 100. For example, in some of the specific examples provided below, each of the LCS provisioning subsystems 206*a*-206*c* may be provided by a respective datacenter or other computing device/computing component location (e.g., a respective one of the "clouds" that enables the "multi-cloud" computing discussed above) in which the components of that LCS provisioning subsystem are included. However, while a specific configuration of the LCS provisioning system 200 (e.g., including multiple LCS provisioning subsystems 206*a*-206*c*) is illustrated and described, one of skill in the art in possession of the present disclosure will recognize that other configurations of the LCS provisioning system 200 (e.g., a single LCS provisioning subsystem, LCS provisioning subsystems that span multiple datacenters/computing device/computing component locations, etc.) will fall within the scope of the present disclosure as well.

Figure 3:
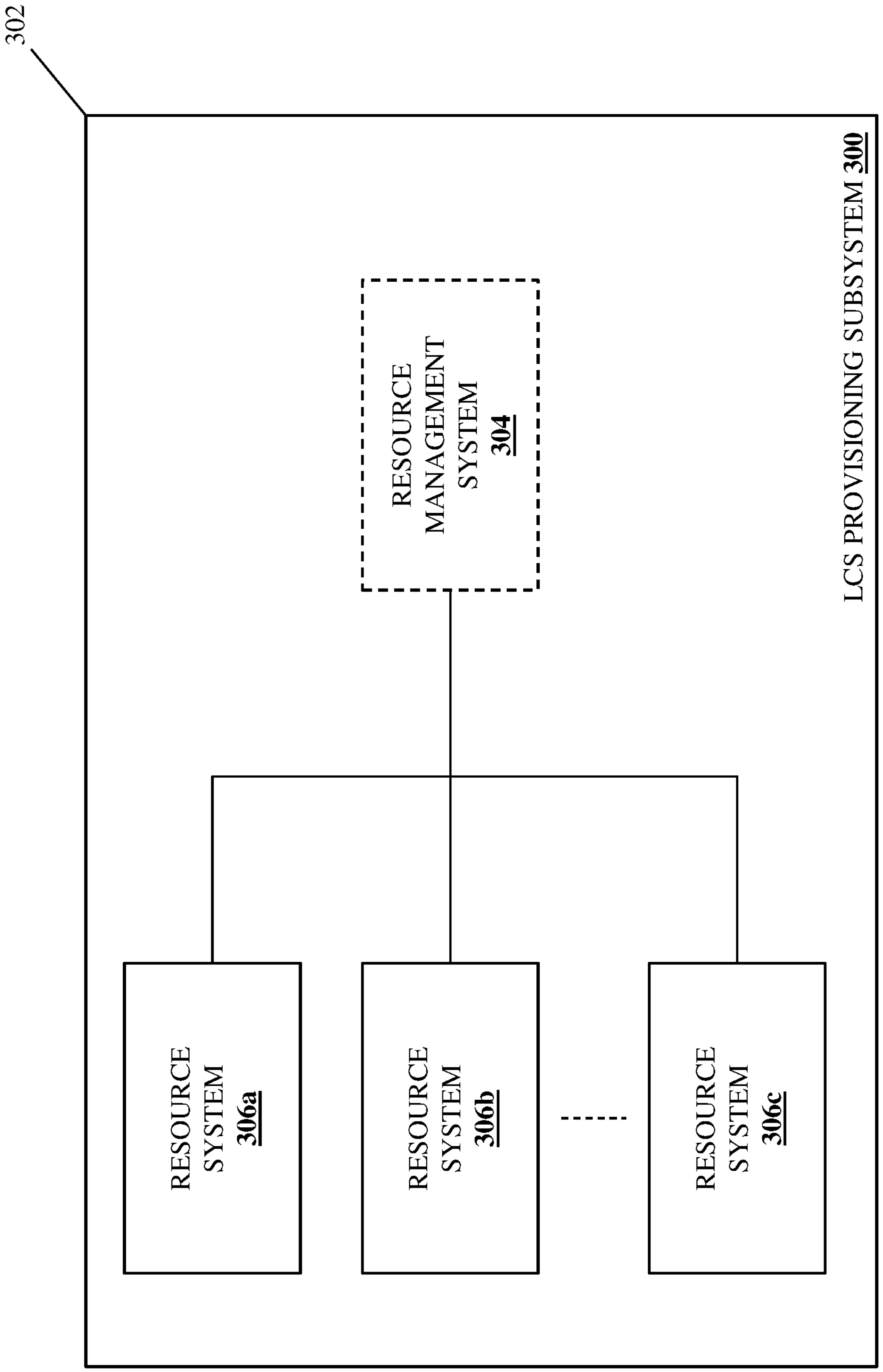
FIG. 3 is a schematic view illustrating an embodiment of an LCS provisioning subsystem that may be included in the LCS provisioning system of FIG. 2.

With reference to FIG. 3, an embodiment of an LCS provisioning subsystem 300 is illustrated that may provide any of the LCS provisioning subsystems 206*a*-206*c* discussed above with reference to FIG. 2. As such, the LCS provisioning subsystem 300 may include one or more of the IHS 100 discussed above with reference to FIG. 1 and/or may include some or all of the components of the IHS 100, and in the specific examples provided below may be provided by a datacenter or other computing device/computing component location in which the components of the LCS provisioning subsystem 300 are included. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

In the illustrated embodiment, the LCS provisioning subsystem 300 is provided in a datacenter 302, and includes a resource management system 304 coupled to a plurality of resource systems 306*a*, 306*b*, and up to 306*c*. In an embodiment, any of the resource management system 304 and the resource systems 306*a*-306*c* may be provided by the IHS 100 discussed above with reference to FIG. 1 and/or may include some or all of the components of the IHS 100. In the specific embodiments provided below, each of the resource management system 304 and the resource systems 306*a*-306*c* may include a System Control Processor (SCP) device that may be conceptualized as an "enhanced" SmartNIC device that may be configured to perform functionality that is not available in conventional SmartNIC devices such as, for example, the resource management functionality, LCS provisioning functionality, and/or other SCP functionality described herein.

In an embodiment, any of the resource systems 306*a*-306*c* may include any of the resources described below coupled to an SCP device that is configured to facilitate management of those resources by the resource management system 304. Furthermore, the SCP device included in the resource management system 304 may provide an SCP Manager (SCPM) subsystem that is configured to manage the SCP devices in the resource systems 306*a*-306*c*, and that performs the functionality of the resource management system 304 described below. In some examples, the resource management system 304 may be provided by a "stand-alone" system (e.g., that is provided in a separate chassis from each of the resource systems 306*a*-306*c*), and the SCPM subsystem discussed below may be provided by a dedicated SCP device, processing/memory resources, and/or other components in that resource management system 304. However, in other embodiments, the resource management system 304 may be provided by one of the resource systems 306*a*-306*c* (e.g., it may be provided in a chassis of one of the resource systems 306*a*-306*c*), and the SCPM subsystem may be provided by an SCP device, processing/memory resources, and/or any other any other components om that resource system.

As such, the resource management system 304 is illustrated with dashed lines in FIG. 3 to indicate that it may be a stand-alone system in some embodiments, or may be provided by one of the resource systems 306*a*-306*c* in other embodiments. Furthermore, one of skill in the art in possession of the present disclosure will appreciate how SCP devices in the resource systems 306*a*-306*c* may operate to "elect" or otherwise select one or more of those SCP devices to operate as the SCPM subsystem that provides the resource management system 304 described below. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

Figure 4:
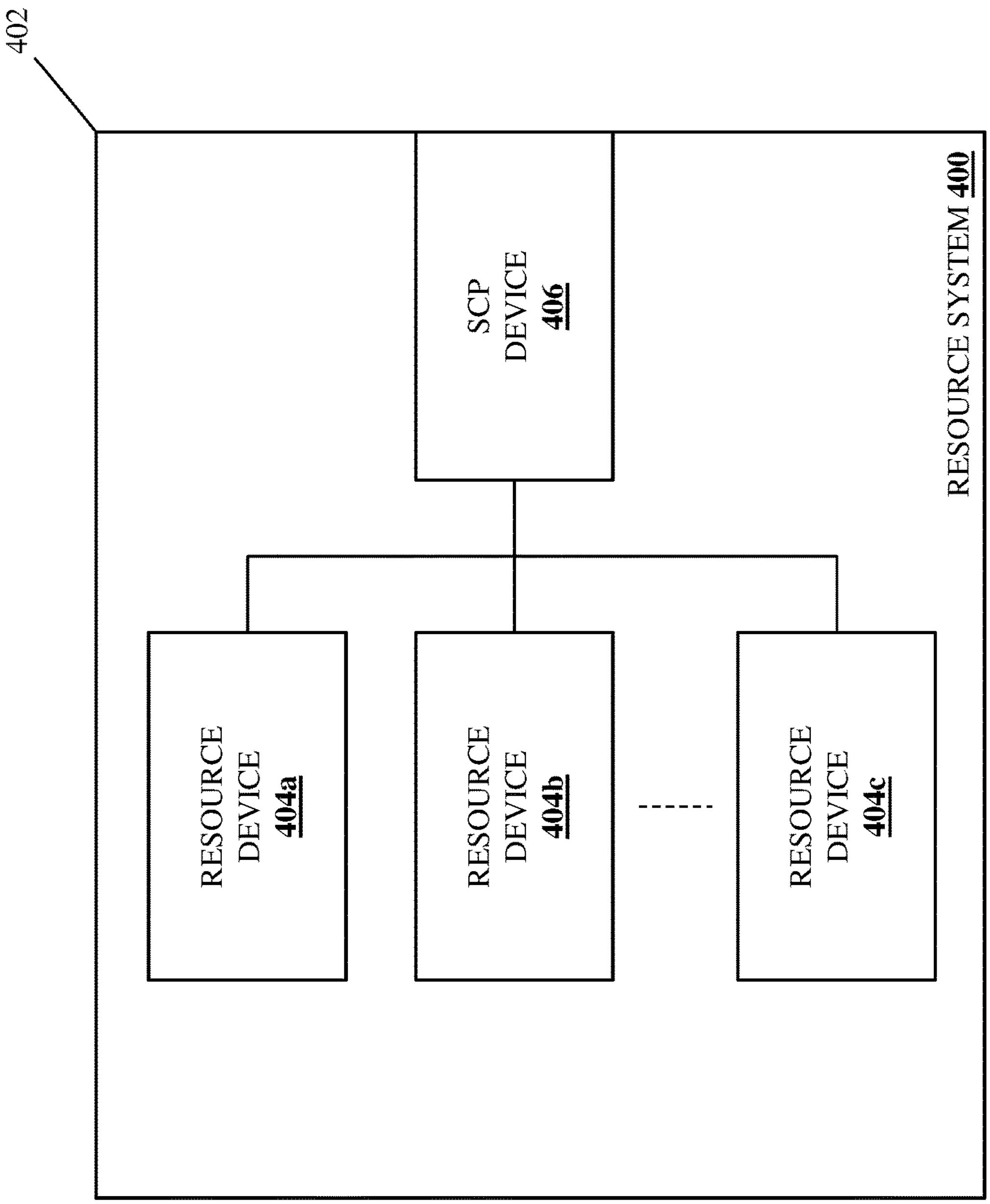
FIG. 4 is a schematic view illustrating an embodiment of a resource system that may be included in the LCS provisioning subsystem of FIG. 3.

With reference to FIG. 4, an embodiment of a resource system 400 is illustrated that may provide any or all of the resource systems 306*a*-306*c* discussed above with reference to FIG. 3. In an embodiment, the resource system 400 may be provided by the IHS 100 discussed above with reference to FIG. 1 and/or may include some or all of the components of the IHS 100. In the illustrated embodiment, the resource system 400 includes a chassis 402 that houses the components of the resource system 400, only some of which are illustrated and discussed below. In the illustrated embodiment, the chassis 402 houses an SCP device 406. In an embodiment, the SCP device 406 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an SCP engine that is configured to perform the functionality of the SCP engines and/or SCP devices discussed below. Furthermore, the SCP device 406 may also include any of a variety of SCP components (e.g., hardware/software) that are configured to enable any of the SCP functionality described below.

In the illustrated embodiment, the chassis 402 also houses a plurality of resource devices 404*a*, 404*b*, and up to 404*c*, each of which is coupled to the SCP device 406. For example, the resource devices 404*a*-404*c* may include processing systems (e.g., first type processing systems such as those available from INTEL® Corporation of Santa Clara, California, United States, second type processing systems such as those available from ADVANCED MICRO DEVICES (AMD)® Inc. of Santa Clara, California, United States, Advanced Reduced Instruction Set Computer (RISC) Machine (ARM) devices, Graphics Processing Unit (GPU) devices, Tensor Processing Unit (TPU) devices, Field Programmable Gate Array (FPGA) devices, accelerator devices, etc.); memory systems (e.g., Persistence MEMory (PMEM) devices (e.g., solid state byte-addressable memory devices that reside on a memory bus), etc.); storage devices (e.g., Non-Volatile Memory express over Fabric (NVMe-oF) storage devices, Just a Bunch Of Flash (JBOF) devices, etc.); networking devices (e.g., Network Interface Controller (NIC) devices, etc.); and/or any other devices that one of skill in the art in possession of the present disclosure would recognize as enabling the functionality described as being enabled by the resource devices 404*a*-404*c* discussed below. As such, the resource devices 404*a*-404*c* in the resource systems 306*a*-306*c*/400 may be considered a "pool" of resources that are available to the resource management system 304 for use in composing LCSs.

To provide a specific example, the SCP devices described herein may operate to provide a Root-of-Trust (ROT) for their corresponding resource devices/systems, to provide an intent management engine for managing the workload intents discussed below, to perform telemetry generation and/or reporting operations for their corresponding resource devices/systems, to perform identity operations for their corresponding resource devices/systems, to provide an image boot engine (e.g., an operating system image boot engine) for LCSs composed using a processing system/memory system controlled by that SCP device, and/or perform any other operations that one of skill in the art in possession of the present disclosure would recognize as providing the functionality described below. Further, as discussed below, the SCP devices describe herein may include Software-Defined Storage (SDS) subsystems, inference subsystems, data protection subsystems, Software-Defined Networking (SDN) subsystems, trust subsystems, data management subsystems, compression subsystems, encryption subsystems, and/or any other hardware/software described herein that may be allocated to an LCS that is composed using the resource devices/systems controlled by that SCP device. However, while an SCP device is illustrated and described as performing the functionality discussed below, one of skill in the art in possession of the present disclosure will appreciate that functionality described herein may be enabled on other devices while remaining within the scope of the present disclosure as well.

Thus, the resource system 400 may include the chassis 402 including the SCP device 406 connected to any combinations of resource devices. To provide a specific embodiment, the resource system 400 may provide a "Bare Metal Server" that one of skill in the art in possession of the present disclosure will recognize may be a physical server system that provides dedicated server hosting to a single tenant, and thus may include the chassis 402 housing a processing system and a memory system, the SCP device 406, as well as any other resource devices that would be apparent to one of skill in the art in possession of the present disclosure. However, in other specific embodiments, the resource system 400 may include the chassis 402 housing the SCP device 406 coupled to particular resource devices 404*a*-404*c*. For example, the chassis 402 of the resource system 400 may house a plurality of processing systems (i.e., the resource devices 404*a*-404*c*) coupled to the SCP device 406. In another example, the chassis 402 of the resource system 400 may house a plurality of memory systems (i.e., the resource devices 404*a*-404*c*) coupled to the SCP device 406. In another example, the chassis 402 of the resource system 400 may house a plurality of storage devices (i.e., the resource devices 404*a*-404*c*) coupled to the SCP device 406. In another example, the chassis 402 of the resource system 400 may house a plurality of networking devices (i.e., the resource devices 404*a*-404*c*) coupled to the SCP device 406. However, one of skill in the art in possession of the present disclosure will appreciate that the chassis 402 of the resource system 400 housing a combination of any of the resource devices discussed above will fall within the scope of the present disclosure as well.

As discussed in further detail below, the SCP device 406 in the resource system 400 will operate with the resource management system 304 (e.g., an SCPM subsystem) to allocate any of its resources devices 404*a*-404*c* for use in a providing an LCS. Furthermore, the SCP device 406 in the resource system 400 may also operate to allocate SCP hardware and/or perform functionality, which may not be available in a resource device that it has allocated for use in providing an LCS, in order to provide any of a variety of functionality for the LCS. For example, the SCP engine and/or other hardware/software in the SCP device 406 may be configured to perform encryption functionality, compression functionality, and/or other storage functionality known in the art, and thus if that SCP device 406 allocates storage device(s) (which may be included in the resource devices it controls) for use in a providing an LCS, that SCP device 406 may also utilize its own SCP hardware and/or software to perform that encryption functionality, compression functionality, and/or other storage functionality as needed for the LCS as well. However, while particular SCP-enabled storage functionality is described herein, one of skill in the art in possession of the present disclosure will appreciate how the SCP devices 406 described herein may allocate SCP hardware and/or perform other enhanced functionality for an LCS provided via allocation of its resource devices 404*a*-404*c* while remaining within the scope of the present disclosure as well.

Figure 5:
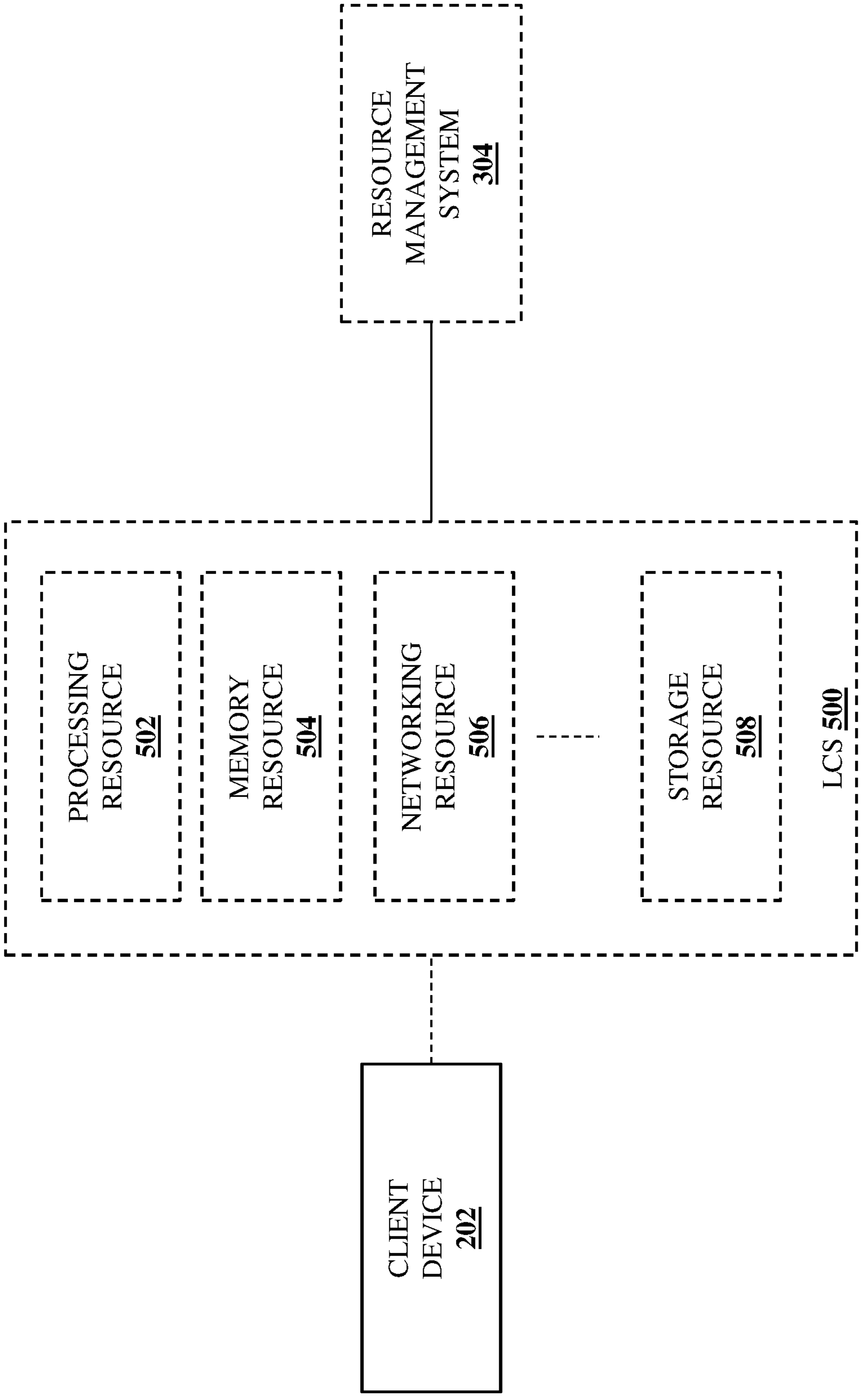
FIG. 5 is a schematic view illustrating an embodiment of the provisioning of an LCS using the LCS provisioning system of FIG. 2.

With reference to FIG. 5, an example of the provisioning of an LCS 500 to one of the client device(s) 202 is illustrated. For example, the LCS provisioning system 200 may allow a user of the client device 202 to express a "workload intent" that describes the general requirements of a workload that user would like to perform (e.g., "I need an LCS with 10 gigahertz (Ghz) of processing power and 8 gigabytes (GB) of memory capacity for an application requiring 20 terabytes (TB) of high-performance protected-object-storage for use with a hospital-compliant network", or "I need an LCS for a machine-learning environment requiring Tensorflow processing with 3 TBs of Accelerator PMEM memory capacity"). As will be appreciated by one of skill in the art in possession of the present disclosure, the workload intent discussed above may be provided to one of the LCS provisioning subsystems 206*a*-206*c*, and may be satisfied using resource systems that are included within that LCS provisioning subsystem, or satisfied using resource systems that are included across the different LCS provisioning subsystems 206*a*-206*c*.

As such, the resource management system 304 in the LCS provisioning subsystem that received the workload intent may operate to compose the LCS 500 using resource devices 404*a*-404*c* in the resource systems 306*a*-306*c*/400 in that LCS provisioning subsystem, and/or resource devices 404*a*-404*c* in the resource systems 306*a*-306*c*/400 in any of the other LCS provisioning subsystems. FIG. 5 illustrates the LCS 500 including a processing resource 502 allocated from one or more processing systems provided by one or more of the resource devices 404*a*-404*c* in one or more of the resource systems 306*a*-306*c*/400 in one or more of the LCS provisioning subsystems 206*a*-206*c*, a memory resource 504 allocated from one or more memory systems provided by one or more of the resource devices 404*a*-404*c* in one or more of the resource systems 306*a*-306*c*/400 in one or more of the LCS provisioning subsystems 206*a*-206*c*, a networking resource 506 allocated from one or more networking devices provided by one or more of the resource devices 404*a*-404*c* in one or more of the resource systems 306*a*-306*c*/400 in one or more of the LCS provisioning subsystems 206*a*-206*c*, and/or a storage resource 508 allocated from one or more storage devices provided by one or more of the resource devices 404*a*-404*c* in one or more of the resource systems 306*a*-306*c*/400 in one or more of the LCS provisioning subsystems 206*a*-206*c*.

Furthermore, as will be appreciated by one of skill in the art in possession of the present disclosure, any of the processing resource 502, memory resource 504, networking resource 506, and the storage resource 508 may be provided from a portion of a processing system (e.g., a core in a processor, a time-slice of processing cycles of a processor, etc.), a portion of a memory system (e.g., a subset of memory capacity in a memory device), a portion of a storage device (e.g., a subset of storage capacity in a storage device), and/or a portion of a networking device (e.g., a portion of the bandwidth of a networking device). Further still, as discussed above, the SCP device(s) 406 in the resource systems 306*a*-306*c*/400 that allocate any of the resource devices 404*a*-404*c* that provide the processing resource 502, memory resource 504, networking resource 506, and the storage resource 508 in the LCS 500 may also allocate their SCP hardware and/or perform enhanced functionality (e.g., the enhanced storage functionality in the specific examples provided above) for any of those resources that may otherwise not be available in the processing system, memory system, storage device, or networking device allocated to provide those resources in the LCS 500.

With the LCS 500 composed using the processing resources 502, the memory resources 504, the networking resources 506, and the storage resources 508, the resource management system 304 may provide the client device 202 resource communication information such as, for example, Internet Protocol (IP) addresses of each of the systems/ devices that provide the resources that make up the LCS 500, in order to allow the client device 202 to communicate with those systems/devices in order to utilize the resources that make up the LCS 500. As will be appreciated by one of skill in the art in possession of the present disclosure, the resource communication information may include any information that allows the client device 202 to present the LCS 500 to a user in a manner that makes the LCS 500 appear the same as an integrated physical system having the same resources as the LCS 500.

Thus, continuing with the specific example above in which the user provided the workload intent defining an LCS with a 10 Ghz of processing power and 8 GB of memory capacity for an application with 20 TB of high-performance protected object storage for use with a hospital-compliant network, the processing resources 502 in the LCS 500 may be configured to utilize 10 Ghz of processing power from processing systems provided by resource device(s) in the resource system(s), the memory resources 504 in the LCS 500 may be configured to utilize 8 GB of memory capacity from memory systems provided by resource device(s) in the resource system(s), the storage resources 508 in the LCS 500 may be configured to utilize 20 TB of storage capacity from high-performance protected-object-storage storage device(s) provided by resource device(s) in the resource system(s), and the networking resources 506 in the LCS 500 may be configured to utilize hospital-compliant networking device(s) provided by resource device(s) in the resource system(s).

Similarly, continuing with the specific example above in which the user provided the workload intent defining an LCS for a machine-learning environment for Tensorflow processing with 3 TBs of Accelerator PMEM memory capacity, the processing resources 502 in the LCS 500 may be configured to utilize TPU processing systems provided by resource device(s) in the resource system(s), and the memory resources 504 in the LCS 500 may be configured to utilize 3 TB of accelerator PMEM memory capacity from processing systems/memory systems provided by resource device(s) in the resource system(s), while any networking/storage functionality may be provided for the networking resources 506 and storage resources 508, if needed.

Figure 6:
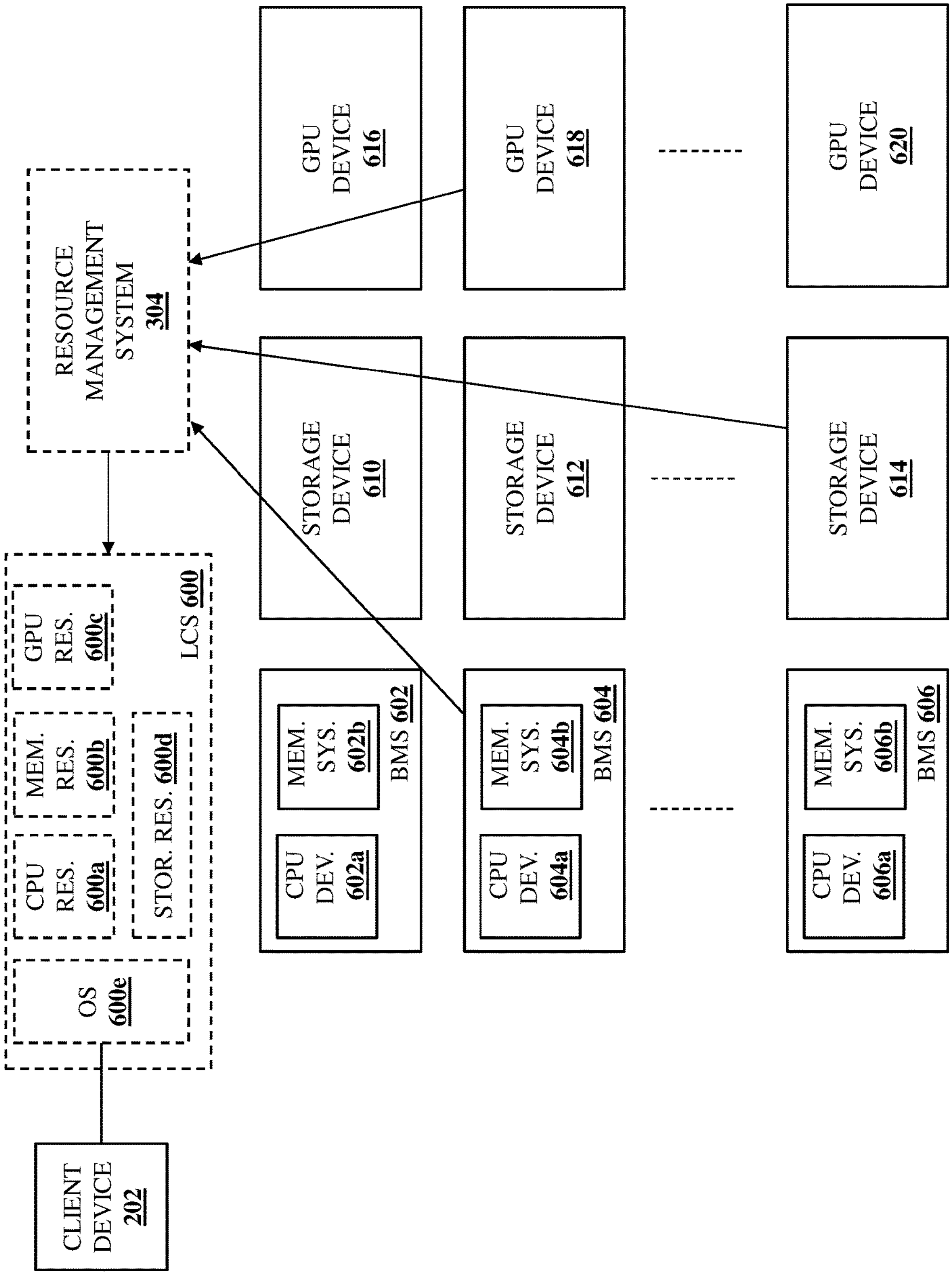
FIG. 6 is a schematic view illustrating an embodiment of the provisioning of an LCS using the LCS provisioning system of FIG. 2.

With reference to FIG. 6, another example of the provisioning of an LCS 600 to one of the client device(s) 202 is illustrated. As will be appreciated by one of skill in the art in possession of the present disclosure, many of the LCSs provided by the LCS provisioning system 200 will utilize a "compute" resource (e.g., provided by a processing resource such as an x86 processor, an AMD processor, an ARM processor, and/or other processing systems known in the art, along with a memory system that includes instructions that, when executed by the processing system, cause the processing system to perform any of a variety of compute operations known in the art), and in many situations those compute resources may be allocated from a Bare Metal Server (BMS) and presented to a client device 202 user along with storage resources, networking resources, other processing resources (e.g., GPU resources), and/or any other resources that would be apparent to one of skill in the art in possession of the present disclosure.

As such, in the illustrated embodiment, the resource systems 306*a*-306*c* available to the resource management system 304 include a Bare Metal Server (BMS) 602 having a Central Processing Unit (CPU) device 602*a* and a memory system 602*b*, a BMS 604 having a CPU device 604*a* and a memory system 604*b*, and up to a BMS 606 having a CPU device 606*a* and a memory system 606*b*. Furthermore, one or more of the resource systems 306*a*-306*c* includes resource devices 404*a*-404*c* provided by a storage device 610, a storage device 612, and up to a storage device 614. Further still, one or more of the resource systems 306*a*-306*c* includes resource devices 404*a*-404*c* provided by a Graphics Processing Unit (GPU) device 616, a GPU device 618, and up to a GPU device 620.

FIG. 6 illustrates how the resource management system 304 may compose the LCS 600 using the BMS 604 to provide the LCS 600 with CPU resources 600*a* that utilize the CPU device 604*a* in the BMS 604, and memory resources 600*b* that utilize the memory system 604*b* in the BMS 604. Furthermore, the resource management system 304 may compose the LCS 600 using the storage device 614 to provide the LCS 600 with storage resources 600*d*, and using the GPU device 318 to provide the LCS 600 with GPU resources 600*c*. As illustrated in the specific example in FIG. 6, the CPU device 604*a* and the memory system 604*b* in the BMS 604 may be configured to provide an operating system 600*e* that is presented to the client device 202 as being provided by the CPU resources 600*a* and the memory resources 600*b* in the LCS 600, with operating system 600*e* utilizing the GPU device 618 to provide the GPU resources 600*c* in the LCS 600, and utilizing the storage device 614 to provide the storage resources 600*d* in the LCS 600. The user of the client device 202 may then provide any application(s) on the operating system 600*e* provided by the CPU resources 600*a*/CPU device 604*a* and the memory resources 600*b*/memory system 604*b* in the LCS 600/BMS 604, with the application(s) operating using the CPU resources 600*a*/CPU device 604*a*, the memory resources 600*b*/memory system 604*b*, the GPU resources 600*c*/GPU device 618, and the storage resources 600*d*/storage device 614.

Furthermore, as discussed above, the SCP device(s) 406 in the resource systems 306*a*-306*c*/400 that allocates any of the CPU device 604*a* and memory system 604*b* in the BMS 604 that provide the CPU resource 600*a* and memory resource 600*b*, the GPU device 618 that provides the GPU resource 600*c*, and the storage device 614 that provides storage resource 600*d*, may also allocate SCP hardware and/or perform enhanced functionality (e.g., the enhanced storage functionality in the specific examples provided above) for any of those resources that may otherwise not be available in the CPU device 604*a*, memory system 604*b*, storage device 614, or GPU device 618 allocated to provide those resources in the LCS 500.

However, while simplified examples are described above, one of skill in the art in possession of the present disclosure will appreciate how multiple devices/systems (e.g., multiple CPUs, memory systems, storage devices, and/or GPU devices) may be utilized to provide an LCS. Furthermore, any of the resources utilized to provide an LCS (e.g., the CPU resources, memory resources, storage resources, and/or GPU resources discussed above) need not be restricted to the same device/system, and instead may be provided by different devices/systems over time (e.g., the GPU resources 600*c* may be provided by the GPU device 618 during a first time period, by the GPU device 616 during a second time period, and so on) while remaining within the scope of the present disclosure as well. Further still, while the discussions above imply the allocation of physical hardware to provide LCSs, one of skill in the art in possession of the present disclosure will recognize that the LCSs described herein may be composed similarly as discussed herein from virtual resources. For example, the resource management system 304 may be configured to allocate a portion of a logical volume provided in a Redundant Array of Independent Disk (RAID) system to an LCS, allocate a portion/time-slice of GPU processing performed by a GPU device to an LCS, and/or perform any other virtual resource allocation that would be apparent to one of skill in the art in possession of the present disclosure in order to compose an LCS.

Similarly as discussed above, with the LCS 600 composed using the CPU resources 600*a*, the memory resources 600*b*, the GPU resources 600*c*, and the storage resources 600*d*, the resource management system 304 may provide the client device 202 resource communication information such as, for example, Internet Protocol (IP) addresses of each of the systems/devices that provide the resources that make up the LCS 600, in order to allow the client device 202 to communicate with those systems/devices in order to utilize the resources that make up the LCS 600. As will be appreciated by one of skill in the art in possession of the present disclosure, the resource communication information allows the client device 202 to present the LCS 600 to a user in a manner that makes the LCS 600 appear the same as an integrated physical system having the same resources as the LCS 600.

As will be appreciated by one of skill in the art in possession of the present disclosure, the LCS provisioning system 200 discussed above solves issues present in conventional Information Technology (IT) infrastructure systems that utilize "purpose-built" devices (server devices, storage devices, etc.) in the performance of workloads and that often result in resources in those devices being underutilized. This is accomplished, at least in part, by having the resource management system(s) 304 "build" LCSs that satisfy the needs of workloads when they are deployed. As such, a user of a workload need simply define the needs of that workload via a "manifest" expressing the workload intent of the workload, and resource management system 304 may then compose an LCS by allocating resources that define that LCS and that satisfy the requirements expressed in its workload intent, and present that LCS to the user such that the user interacts with those resources in same manner as they would physical system at their location having those same resources.

However, as discussed above, conventional drivers provided for resource devices used for LCSs (e.g., CSI drivers provided for storage devices to enable those storage devices to expose block and file storage systems to containerized workloads provided using the KUBERNETES® container orchestration system) operate to expose all the capabilities available from the resource device for which they are provided, including capabilities that are not utilized with their LCS to perform its workload, capabilities that can introduce security issues and attack vectors, and/or other driver-enabled LCS resource capabilities that can introduce other issues known in the art. As such, the inventors of the present disclosure have developed a workload-intent-based LCS resource capability configuration system that operates to configure resource device(s) used to provide an LCS with limited capabilities based on the workload intent for the workload that LCS will perform, one or more policies for the user/client device/tenant that requested that LCS, and/or other factors that would be apparent to one of skill in the art in possession of the present disclosure.

Figure 7:
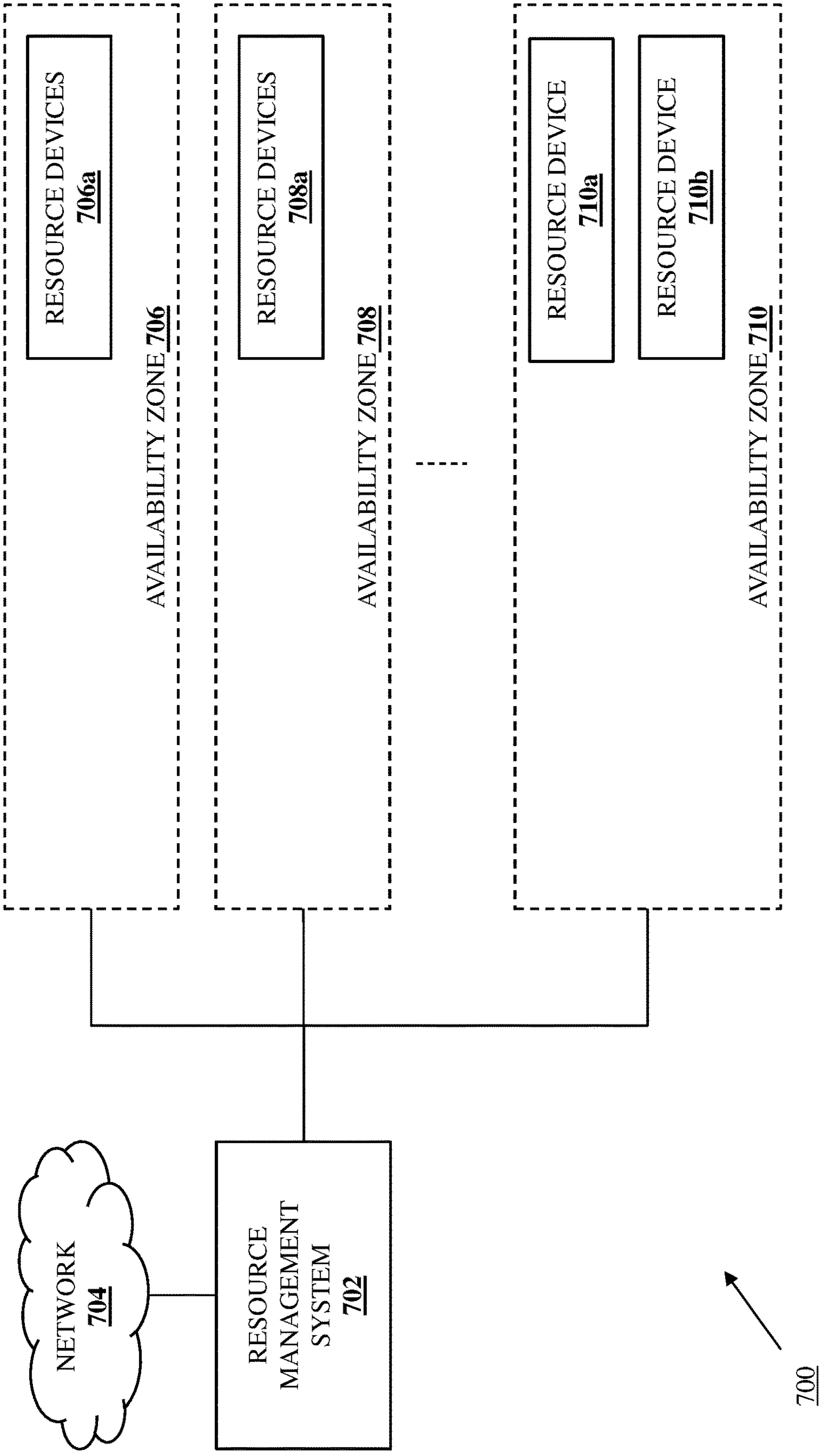
FIG. 7 is a schematic view illustrating an embodiment of an LCS provisioning subsystem that may be included in the LCS provisioning system of FIG. 2.

Referring now to FIG. 7, an embodiment of a LCS provisioning subsystem 700 is illustrated that may be provided by the LCS provisioning subsystem 300 discussed above with reference to FIG. 3, which may be included in the LCS provisioning system 200 discussed above with reference to FIG. 2 as described above. In the illustrated embodiment, the LCS provisioning subsystem 700 includes a resource management system 702 that may be provided by the resource management system 304 included in the LCS provisioning subsystem 300 discussed above with reference to FIG. 3. As such, the resource management system 702 may be provided by the IHS 100 discussed above with reference to FIG. 1 and/or may include some or all of the components of the IHS 100, and in specific embodiments the resource management system 304 may include an SCP device that may be conceptualized as an "enhanced" SmartNIC device that may be configured to perform functionality that is not available in conventional SmartNIC devices such as, for example, the resource management functionality, LCS provisioning functionality, workload-intent-based LCS resource capability configuration functionality, and/or other SCP functionality described herein. Furthermore, the resource management system 702 is coupled to a network 704 that may be provided by the network 204 included in the LCS provisioning system 200 discussed above with reference to FIG. 2, and thus may include a LAN, the Internet, combinations thereof, and/or any of network that would be apparent to one of skill in the art in possession of the present disclosure.

In the specific examples illustrated and described below, resource devices coupled to the resource management system 702 (e.g., any of the resource devices 404*a*, 404*b*, and up to 404*c* included in the resource systems 306*a*/400, 306*b*/400, and up to 306*c*/400 discussed above with reference to FIGS. 3 and 4) may be provided in availability zones that each group respective resource devices that may be used to provide LCSs as described above based on their physical location (e.g., resource devices located in one or more first racks in a datacenter may be grouped in a first availability zone, resource devices located in one or more second racks in that datacenter may be grouped in a second availability zone, etc.), based on their geographic location (e.g., resource devices located in one or more datacenters on the East Coast of the United States may be grouped in a first availability zone, resource devices located in one or more datacenters on the West Coast of the United States may be grouped in a second availability zone, etc.), and/or based on any other availability zone factors that would be apparent to one of skill in the art in possession of the present disclosure. As such, the resource devices 706*a* and 708*a* may be utilized to allow for the mirroring of data storage across the different availability zones 706 and 708, as well as provide other multi-availability zone benefits that would be apparent to one of skill in the art in possession of the present disclosure.

In the specific example illustrated in FIG. 7, an availability zone 706 includes a plurality of resource devices 706*a*, an availability zone 708 includes a plurality of resource devices 708*a*, and an availability zone 710 include a plurality of resource devices 710*a* and a plurality of resource devices 710*b*. However, while a specific examples of resource devices in different availability zones is illustrated and described herein, one of skill in the art in possession of the present disclosure will appreciate how resource devices may be coupled to the resource management system 702 in other manners that will fall within the scope of the present disclosure as well. Furthermore, while a specific LCS provisioning subsystem 700 has been illustrated and described, one of skill in the art in possession of the present disclosure will recognize that the LCS provisioning system of the present disclosure may include a variety of components and component configurations while remaining within the scope of the present disclosure as well.

Figure 8:
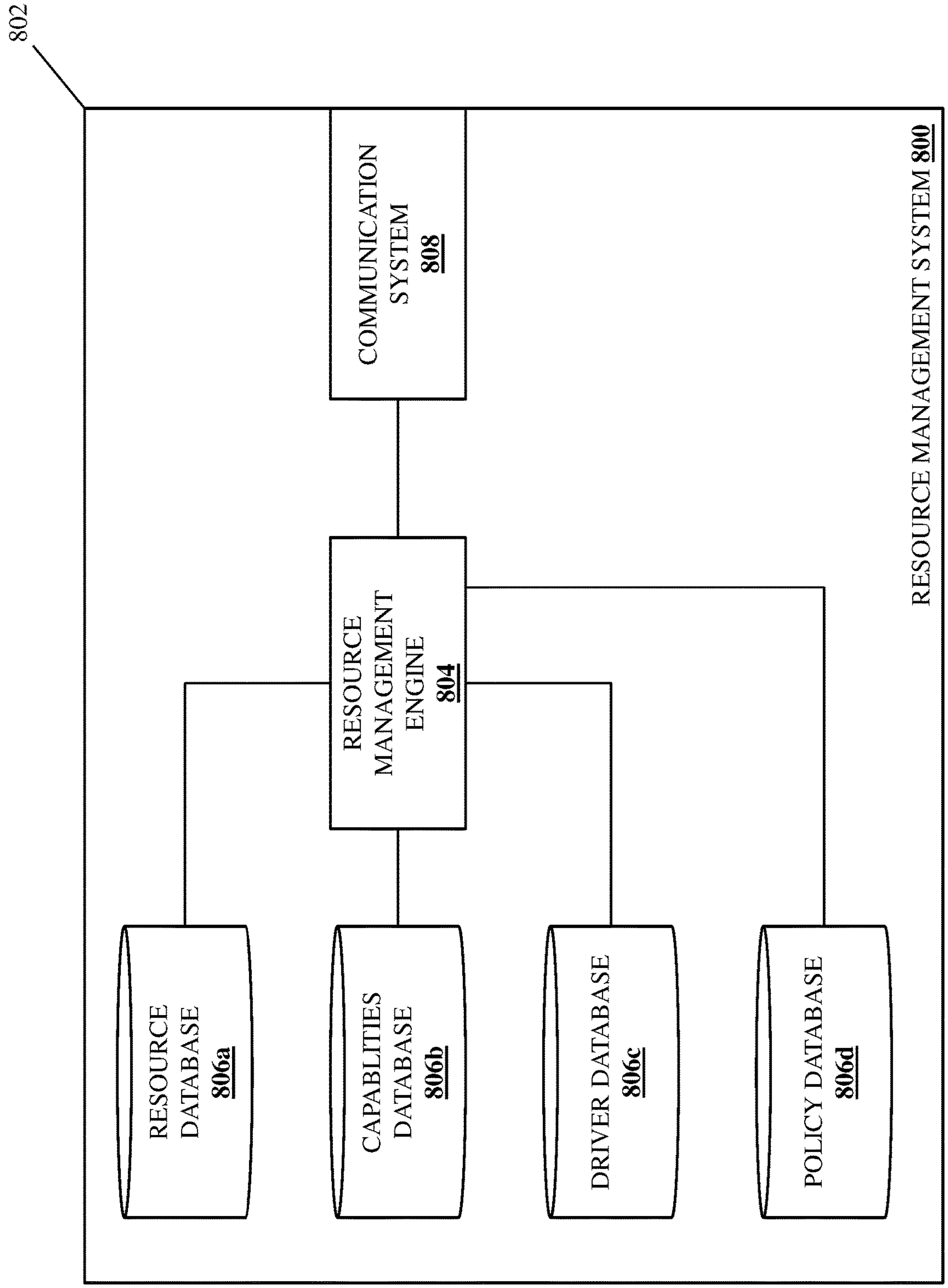
FIG. 8 is a schematic view illustrating an embodiment of a resource management system that may be included in the LCS provisioning subsystem of FIG. 7.

Referring now to FIG. 8, an embodiment of a resource management system 800 is illustrated that may provide the resource management system 702 discussed above with reference to FIG. 7. As such, the resource management system 800 may be provided by the IHS 100 discussed above with reference to FIG. 1 and/or may include some or all of the components of the IHS 100, and in specific examples may be provided by the SCP devices described above. Furthermore, while illustrated and discussed as being provided by an SCP device, one of skill in the art in possession of the present disclosure will recognize that the functionality of the resource management system 800 discussed below may be provided by other devices that are configured to operate similarly as the resource management system 800 discussed below.

In the illustrated embodiment, the resource management system 800 includes a chassis 802 that houses the components of the resource management system 800, only some of which are illustrated and described below. For example, the chassis 802 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a resource management engine 804 that is configured to perform the functionality of the resource management engines, resource management subsystems, and/or resource management systems discussed below.

The chassis 802 may also house a storage system (not illustrated, but which may include the storage 108 discussed above with reference to FIG. 1) that is coupled to the resource management engine 804 (e.g., via a coupling between the storage system and the processing system) and that, in the illustrated embodiment, includes a resource database 806*a* that may identify resource devices coupled to the resource management system 800, a capabilities database 806*b* that may identify capabilities of resource devices coupled to the resource management system 800, a driver database 806*c* that may include drivers for the resource devices coupled to the resource management system 800, a policy database 806*d* that may include policies for users/tenants/client devices and/or LCSs, and/or other databases that may store any of the other information that one of skill in the art in possession of the present disclosure will recognize may be utilized by the resource management engine 804. Furthermore, while illustrated as included in the resource management system 800, one of skill in the art in possession of the present disclosure will appreciate how any or all of the databases 806*a*-806*d* may be located outside of the resource management system 800 (i.e., while still being accessible to the resource management engine 804) while remaining within the scope of the present disclosure as well.

The chassis 802 may also house a communication system 808 that is coupled to the resource management engine 804 (e.g., via a coupling between the communication system 808 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific resource management system 800 has been illustrated and described, one of skill in the art in possession of the present disclosure will recognize that resource management systems (or other devices operating according to the teachings of the present disclosure in a manner similar to that described below for the resource management system 800) may include a variety of components and/or component configurations for providing conventional resource management system functionality, as well as the workload-intent-based LCS resource capability configuration functionality discussed below, while remaining within the scope of the present disclosure as well.

Figure 9:
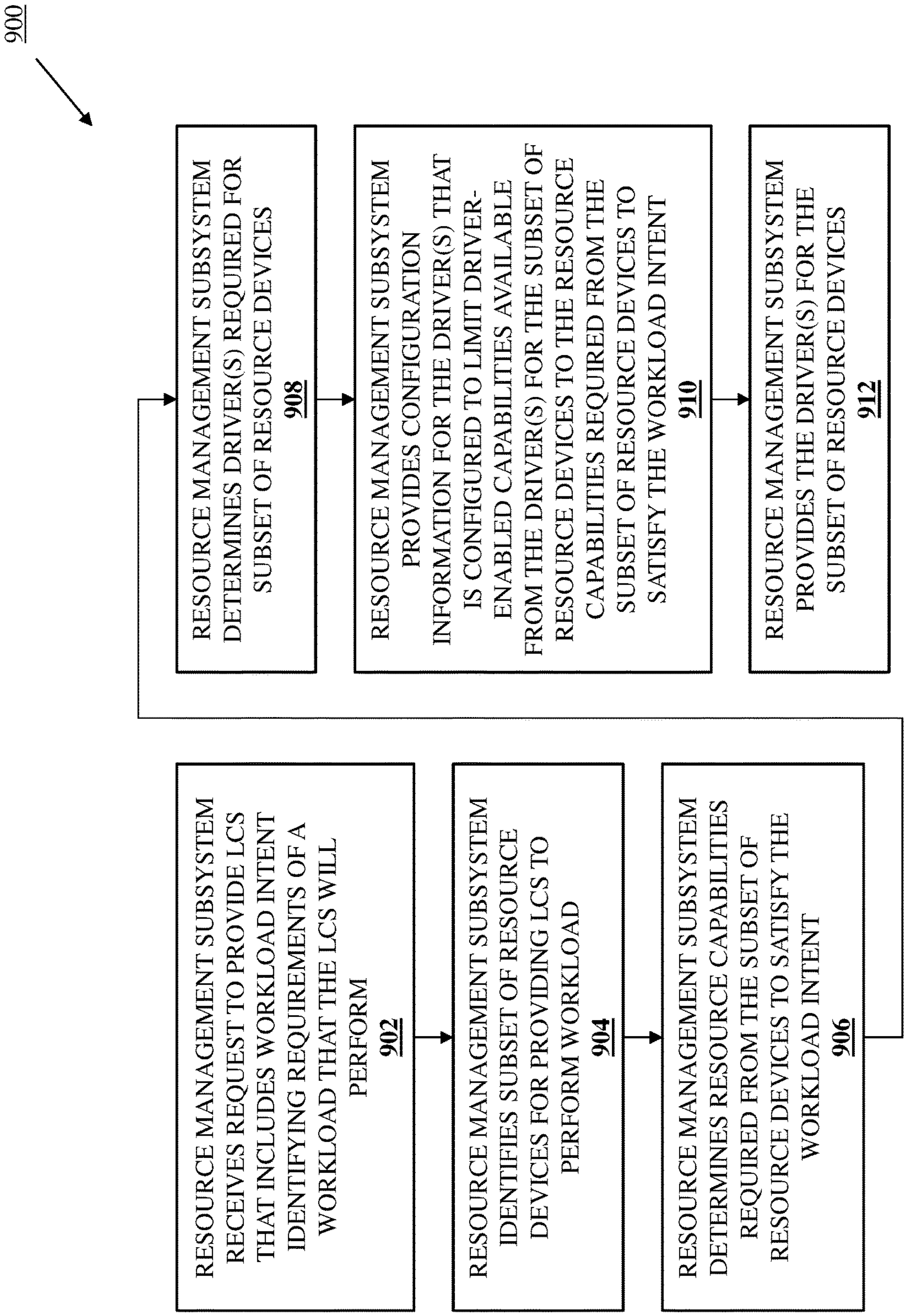
FIG. 9 is a flow chart illustrating an embodiment of a method for configuring resource capabilities for an LCS based on an workload intent.

Referring now to FIG. 9, an embodiment of a method 900 for configuring resource capabilities for a Logically Composed System (LCS) based on a workload intent for that LCS is illustrated. As discussed below, the systems and methods of the present disclosure provide for the configuration of capabilities of resource devices used to provide an LCS in order to limit the capabilities of those resource devices to only those required for a workload that LCS will perform. For example, the workload-intent-based LCS resource capability configuration system of the present disclosure may include a resource management system coupled to resource devices. The resource management system receives a request to provide an LCS that includes workload intent identifying requirements of a workload the LCS will perform, and identifies a subset of the resource devices for providing the LCS to perform the workload. The resource management system then determines resource capabilities required from the subset of the resource devices to satisfy the workload intent, determines driver(s) required for the subset of the resource devices, and provides configuration information for driver(s) that is configured to limit driver-enabled capabilities available from the driver(s) for the subset of the resource devices to the resource capabilities required from the subset of the resource devices to satisfy the workload intent. The resource management system then provides the driver(s) for the subset of the resource devices. As such, unutilized capabilities, capabilities that can introduce security issues and attack vectors, and/or other resource device capabilities may be configured to be unavailable to an LCS based on the requirements of the workload that LCS will perform, policies associated with that LCS or the user/tenant/client device that requested that LCS, and/or other factor that would be apparent to one of skill in the art in possession of the present disclosure.

Figure 10A:
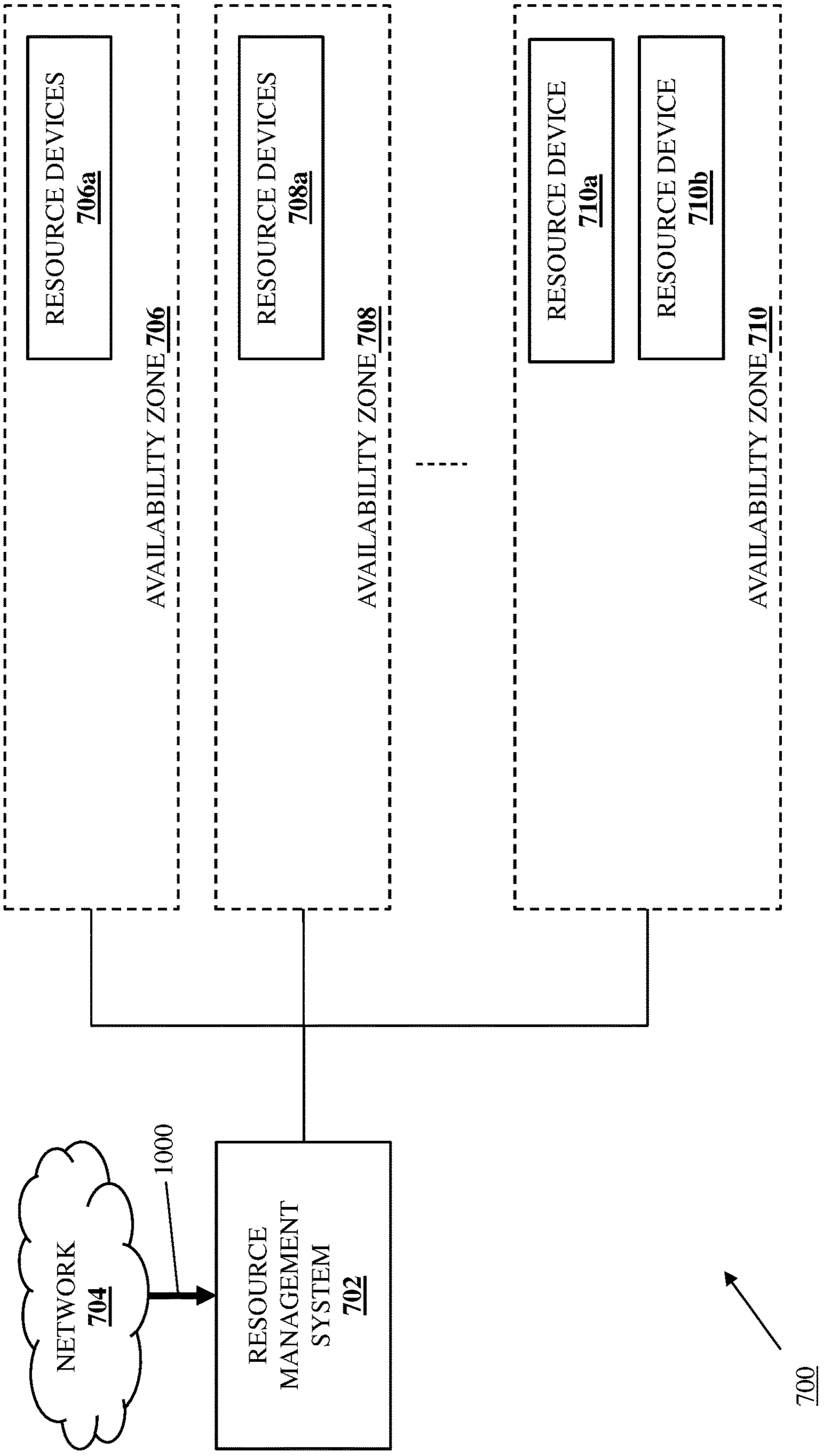
FIG. 10A is a schematic view illustrating an embodiment of the LCS provisioning subsystem of FIG. 7 operating during the method of FIG. 9.
Figure 10B:
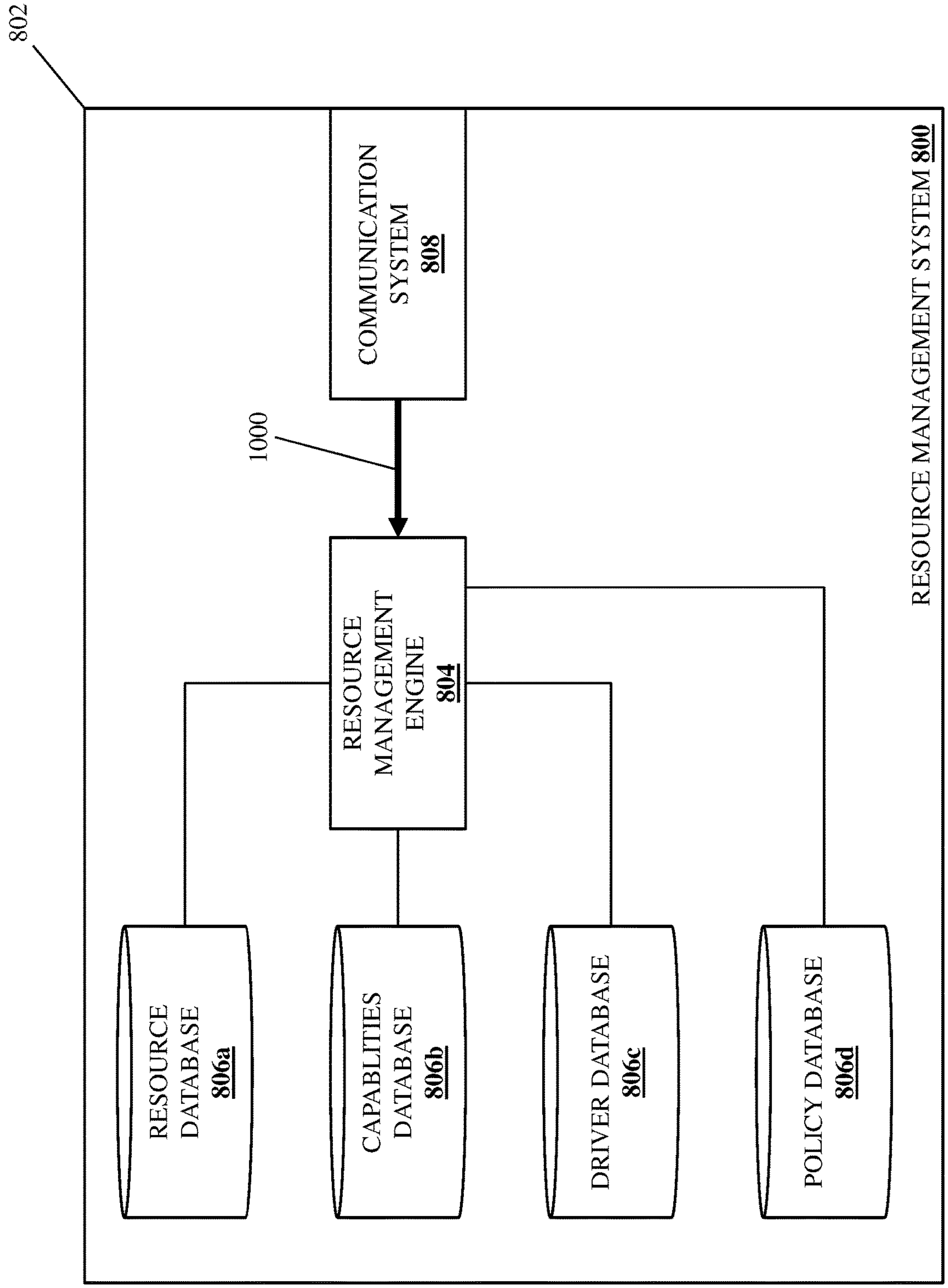
FIG. 10B is a schematic view illustrating an embodiment of the resource management system of FIG. 8 operating during the method of FIG. 9.

The method 900 begins at block 902 where a resource management subsystem receives a request to provide an LCS that includes a workload intent identifying requirements of a workload that the LCS will perform. With reference to FIGS. 10A and 10B, in an embodiment of block 902, the resource management engine 804 in the resource management system 702/800 may perform workload intent receiving operations 1000 that include receiving a workload intent from one of the client devices 202 described above with reference to FIG. 2 via the network 704 and its communication system 808. For example, as described above, the workload intent received at block 902 may describe the general requirements of a workload that user would like to perform (e.g., "I need an LCS with 10 gigahertz (Ghz) of processing power and 8 gigabytes (GB) of memory capacity for an application requiring 20 terabytes (TB) of high-performance protected-object-storage for use with a hospital-compliant network", or "I need an LCS for a machine-learning environment requiring Tensorflow processing with 3 TBs of Accelerator PMEM memory capacity").

As will be appreciated by one of skill in the art in possession of the present disclosure, the performance of workloads identified by workload intents received at block 902 may require LCSs with particular capabilities, while also often not requiring particular capabilities. For example, one of skill in the art in possession of the present disclosure will appreciate how the application for use with the hospital-compliant network described in the example of the workload intent provided above will require the LCS that provides it to include some capabilities and not others, while the machine learning environment described in the example of the workload intent provided above will require the LCS that provides it to include some capabilities and not others. However, while specific examples of workload intents are described above, one of skill in the art in possession of the present disclosure will appreciate how workload intents describing any requirements of any workload will fall within the scope of the present disclosure as well.

Figure 11:
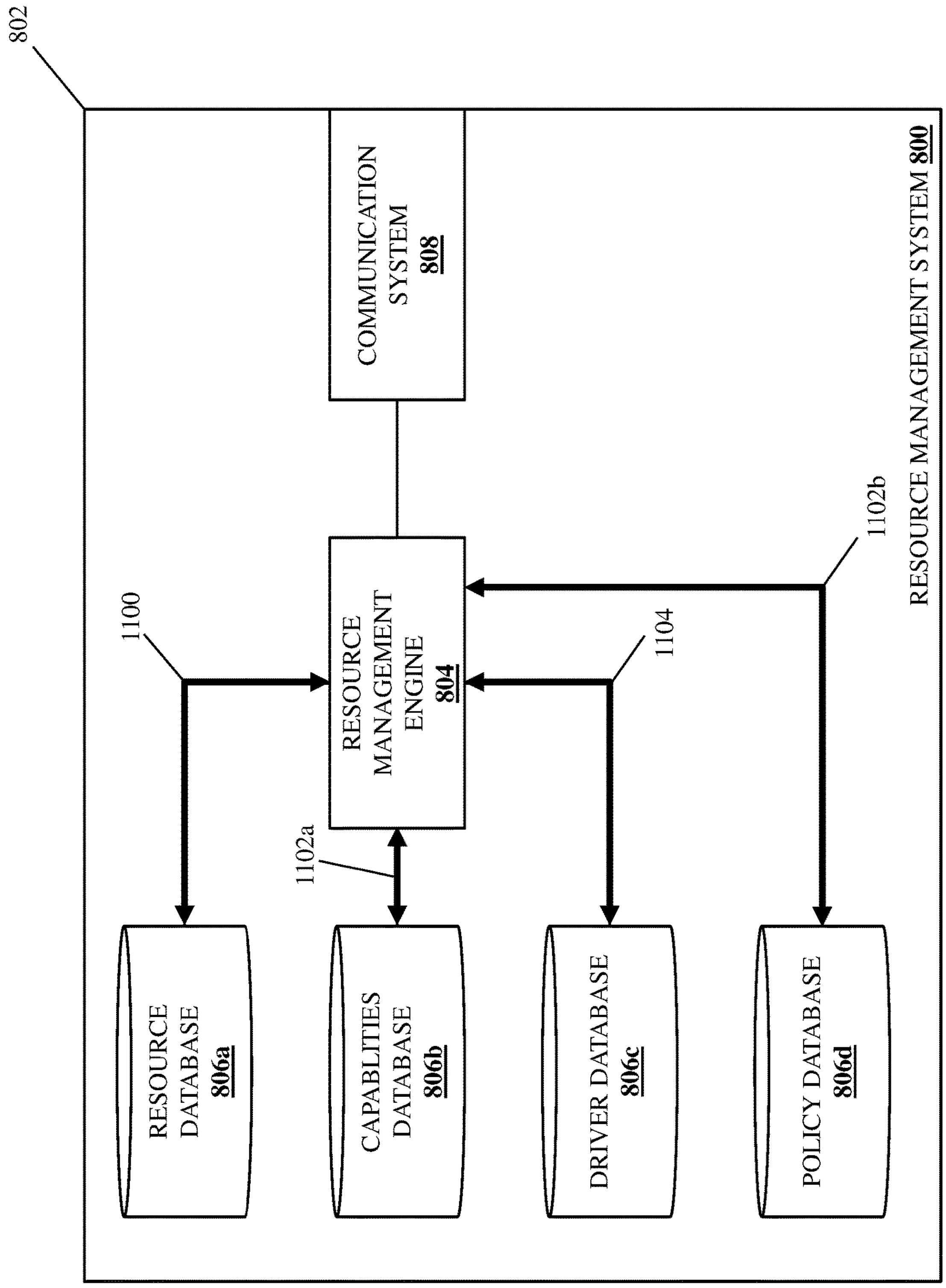
FIG. 11 is a schematic view illustrating an embodiment of the resource management system of FIG. 8 operating during the method of FIG. 9.

The method 900 then proceeds to block 904 where the resource management subsystem identifies a subset of resource devices for providing the LCS to perform the workload. With reference to FIG. 11, in an embodiment of block 904 and based on the workload intent received at block 902, the resource management engine 804 in the resource management system 702/800 may perform resource device identification operations 1100 that may include identifying resource devices in the resource database 806*a* that may be used to provide an LCS to perform the workload defined by the workload intent received at block 902. As discussed above, the resource database 806*a* may identify resource devices coupled to the resource management system 800, and one of skill in the art in possession of the present disclosure will appreciate how the resource management engine 804 may utilize the requirements of the workload included in the workload intent to identify processing systems, memory systems, storage systems, networking systems, and/or any other resource devices that are available for use in providing an LCS that can perform that workload.

For example, for the workload intent described in the example above that includes the application for use with the hospital-compliant network, at block 904 the resource management engine 804 in the resource management system 702/800 may identify one or more processing systems with at least10 gigahertz (Ghz) of processing power, one or more memory systems with at least 8 gigabytes (GB) of memory capacity, and one or mor storage systems with at least 20 terabytes (TB) of high-performance protected-object-storage. Similarly, for the workload intent described in the example above that includes the machine learning environment, at block 904 the resource management engine 804 may identify one or more processing systems that are configured to perform Tensorflow processing, and one or more memory systems with 3 TBs of Accelerator PMEM memory capacity. However, while specific examples of resource device identification have been provided, one of skill in the art in possession of the present disclosure will appreciate how a variety of resource devices may be identified based on a workload intent while remaining within the scope of the present disclosure as well.

The method 900 then proceeds to block 906 where the resource management subsystem determines resource capabilities required from the subset of resource devices to satisfy the workload intent. With continued reference to FIG. 11, in an embodiment of block 906 and based on the workload intent received at block 902, the resource management engine 804 in the resource management system 702/800 may perform resource capability determination operations 1102*a* that may include identifying resource capabilities for the resource devices that were identified at block 904, and determine which of those resource capabilities are required in order to satisfy the workload intent received at block 902 (e.g., in order to satisfy the workload requirements of the workload that will be performed by the LCS provided by those resource devices). As described above, the capabilities database 806*b* may identify capabilities of the resource devices coupled to the resource management system 800, and thus any capabilities of the resource devices identified at block 904 may be determined at block 906, followed by a determination of which of those capabilities are required to satisfy the workload requirements of the workload identified in the workload intent received at block 902.

To provide a specific example, for a storage system identified as a resource device at block 904, the resource capability determination operations 1102*a* performed by the resource management engine 804 at block 906 may include identifying each of the capabilities of the storage devices in that storage system in the resource database 806*a*, and determining that the workload intent requires block storage capabilities from storage device(s) in that storage system, object storage capabilities from storage device(s) in that storage system, or block storage capabilities from first storage device(s) in that storage system and object storage capabilities from second storage device(s) in that storage system.

To provide another specific example, for a storage system that is identified as a resource device at block 904, the resource capability determination operations 1102*a* performed by the resource management engine 804 at block 906 may include identifying each of the capabilities of the storage devices in that storage system in the resource database 806*a*, and determining that the workload intent requires "snapshot" capabilities from storage device(s) in that storage system (e.g., capabilities to create a bitmap across a read/write matrix for the storage device at different points in time). However, while specific examples of storage-system-based resource capabilities have been described, one of skill in the art in possession of the present disclosure will appreciate how processing system capabilities, memory system capabilities, other storage system capabilities, networking system capabilities, accelerator capabilities, and/or other resource capabilities identified and determined to be required to satisfy a workload intent at block 906 while remaining within the scope of the present disclosure as well.

With continued reference to FIG. 11, in an embodiment of block 906 and based on the workload intent received at block 902, the resource management engine 804 in the resource management system 702/800 may also perform resource capability determination operations 1102*b* that may include accessing the policy database 806*a* to identify any policies that are associated with a user of the client device (or the client device itself) that provided the workload intent at block 902, as well as any other tenant associate with an LCS provided according the method 900, and determining whether the capabilities of the resource devices that were identified in the capabilities database 806*a* as part of the resource capability determination operations 1102*a* comply with one or more policies for a user/client device/tenant from which the request to provide the LCS was received, one or more policies for LCSs provided according to the method 900, and/or any other policies that would be apparent to one of skill in the art in possession of the present disclosure.

To provide a specific example, for a storage system that is identified as a resource device at block 904, the resource capability determination operations 1102*b* performed by the resource management engine 804 at block 906 may include identifying a policy that prevents a user/tenant/client device/LCS from utilizing a data deletion capability available from storage device(s) in that storage system (i.e., that user/tenant/client device/LCS may be prevented from deleting data from storage per one or more policies). To provide another specific example, for a processing system that is identified as a resource device at block 904, the resource capability determination operations 1102*b* performed by the resource management engine 804 at block 906 may include identifying a policy that prevents a user/tenant/client device/LCS from utilizing a partitioning capability available from processing device(s) in that processing system (i.e., that user/tenant/client device/LCS may be prevented from partitioning a GPU per one or more policies), or utilizing a partition deletion capability available from processing device(s) in that processing system (i.e., that user/tenant/client device/LCS may be prevented from deleting partitions in a GPU per one or more policies).

To provide another specific example, for a memory system that is identified as a resource device at block 904, the resource capability determination operations 1102*b* performed by the resource management engine 804 at block 906 may include identifying a policy that prevents a user/tenant/client device/LCS from utilizing a memory allocation capability available from memory device(s) in that memory system (i.e., that user/tenant/client device/LCS may be prevented from allocating memory per one or more policies). To provide another specific example, for a measurement subsystem that is included in a resource device identified at block 904, the resource capability determination operations 1102*b* performed by the resource management engine 804 at block 906 may include identifying a policy that prevents a user/tenant/client device/LCS from deleting past measurements made by that measurement system (i.e., that user/tenant/client device/LCS may be prevented from deleting measurements per one or more policies). However, while specific examples of policies that limit utilization of resource capabilities have been described, one of skill in the art in possession of the present disclosure will appreciate how the utilization of any processing system capabilities, memory system capabilities, storage system capabilities, networking system capabilities, accelerator capabilities, and/or other resource capabilities may be limited per one or more policies while remaining within the scope of the present disclosure as well.

The method 900 then proceeds to block 908 where the resource management subsystem determines one or more drivers required for the subset of resource devices. With continued reference to FIG. 11, in an embodiment of block 908, the resource management engine 804 in the resource management system 702/800 may perform driver determination operations 1104 may include determining drivers required for the resource devices that were identified at block 904 in the driver database 806*c*. As discussed above, the driver database 806*c* that may include drivers for resource devices coupled to the resource management system 800, and one of skill in the art in possession of the present disclosure will appreciate how the resource management engine 804 may determine which of those drivers are required for each of the resource devices that were identified at block 904 for providing the LCS.

As discussed above, in some embodiments, the drivers determined at block 908 may be conventional drivers that each includes a driver configuration information that configures that driver to enable all of the capabilities that are available from the resource device for which they are provided. For example, for storage device(s) in a storage system that were identified at block 904, the resource management engine 804 may determine at block 908 that a CSI driver is required for those storage device(s), and that CSI driver may include driver configuration information that configures that CSI driver to enable all of the capabilities that are available from those storage device(s).

However, while the use of conventional drivers including driver configuration information that enables all capabilities on their connected resource device is described herein, one of skill in the art in possession of the present disclosure will appreciate how other drivers (e.g., drivers without any driver configuration information that would configure that driver to enable any of the capabilities that are available from the resource device for which they are provided) may be stored in the driver database 806*c* and determined at block 908 while remaining within the scope of the present disclosure as well. Furthermore, while storage device drivers are described in the specific examples provided above, one of skill in the art in possession of the present disclosure will appreciate how processing device drivers, memory device drivers, other storage device drivers, networking device drivers, accelerator device drivers, and/or any other resource device drivers may be determined at block 908 while remaining within the scope of the present disclosure as well.

Figure 12A:
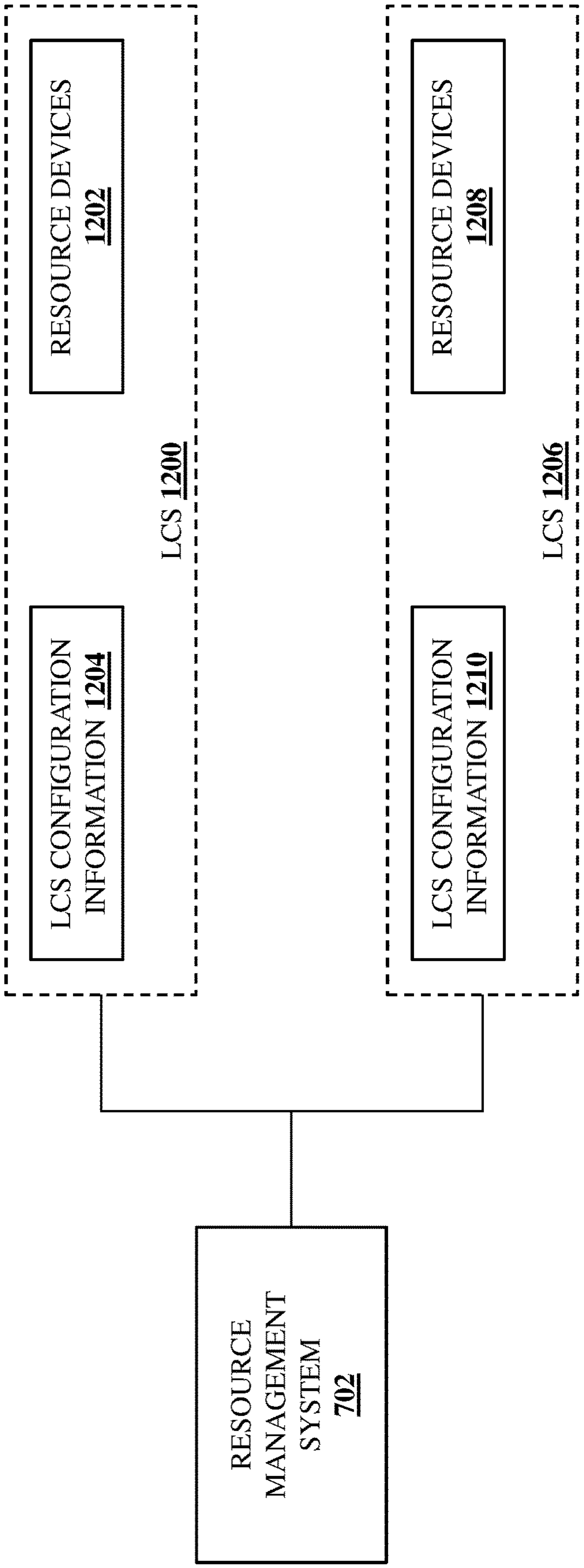
FIG. 12A is a schematic view illustrating an embodiment of the LCS provisioning subsystem of FIG. 7 operating during the method of FIG. 9.

The method 900 then proceeds to block 910 where the resource management subsystem provides configuration information for the one or more drivers that is configured to limit driver-enabled capabilities available from the one or more drivers for the subset of the resource devices to the resource capabilities required from the subset of the resource devices to satisfy the workload intent. With reference to FIG. 12A, in an embodiment of block 910, the resource management engine 804 in the resource management system 702/800 may compose an LCS 1200 based on a workload intent that was received at block 902 using a plurality of resource devices 1202 that were identified at block 904 as described above.

Furthermore, based on the resource capabilities determined at block 906 that are required by the resource devices 1202 to satisfy the workload intent that was received at block 902 (and that may also comply with the policies described above), the resource management engine 804 may generate LCS configuration information 1204 for the LCS 1200 that defines the capabilities that will be provided for the LCS 1200 by its resource devices 1202 in order to satisfy the workload intent of the workload that will be performed by the LCS 1200, with the LCS configuration information 1204 including respective subsets of driver configuration information for one or more of the driver(s) required by the resource devices 1202 that is configured to limit the capabilities of those resources devices 1202 to those required to satisfy the workload intent.

Similarly, the resource management engine 804 in the resource management system 702 may also compose an LCS 1206 based on a workload intent that was received at block 902 using a plurality of resource devices 1208 that were identified at block 904 as described above. Furthermore, based on the resource capabilities determined at block 906 that are required by the resource devices 1208 to satisfy the workload intent that was received at block 902 (and that may also comply with the policies described above), the resource management engine 804 may generate LCS configuration information 1210 for the LCS 1206 that defines the capabilities that will be provided for the LCS 1206 by its resource devices 1208 in order to satisfy the workload intent of the workload that will be performed by the LCS 1206, with the LCS configuration information 1210 including respective subsets of driver configuration information for one or more of the driver(s) required by the resource devices

1208 that are configured to limit the capabilities of those resources devices 1208 to those required to satisfy the workload intent.

As will be appreciated by one of skill in the art in possession of the present disclosure, the LCSs 1200 and 1206 may each be created by the resource management system 702 based on a respective workload intent received at block 902 (e.g., workloads requested by respective users/tenants/etc.), or may both be created by the resource management system 702 based on a single workload intent received at block 902 (e.g., respective LCSs to perform a website provisioning workload and a backend storage workload required by the same user/tenant). Furthermore, while two LCSs are illustrated and described as being provided during the method 900, one of skill in the art in possession of the present disclosure will appreciate how any number of LCSs may be provided during the method 900 while remaining within the scope of the present disclosure.

The method 900 then proceeds to block 912 where the resource management subsystem provides the one or more drivers for the subset of the resource devices. In the example illustrated in FIGS. 12B and 12C, one of the resource devices 706*a* in the availability zone 706 and one of the resource devices 708*a* in the availability zone 708 may be included in the resource devices 1202 used to provide the LCS 1200 discussed above with reference to FIG. 12A, while one of the resource devices 710*a* and one of the resource devices 710*b* in the availability zone 710 may be included in the resource devices 1208 used to provide the LCS 1206 discussed above with reference to FIG. 12A.

Figure 12B:
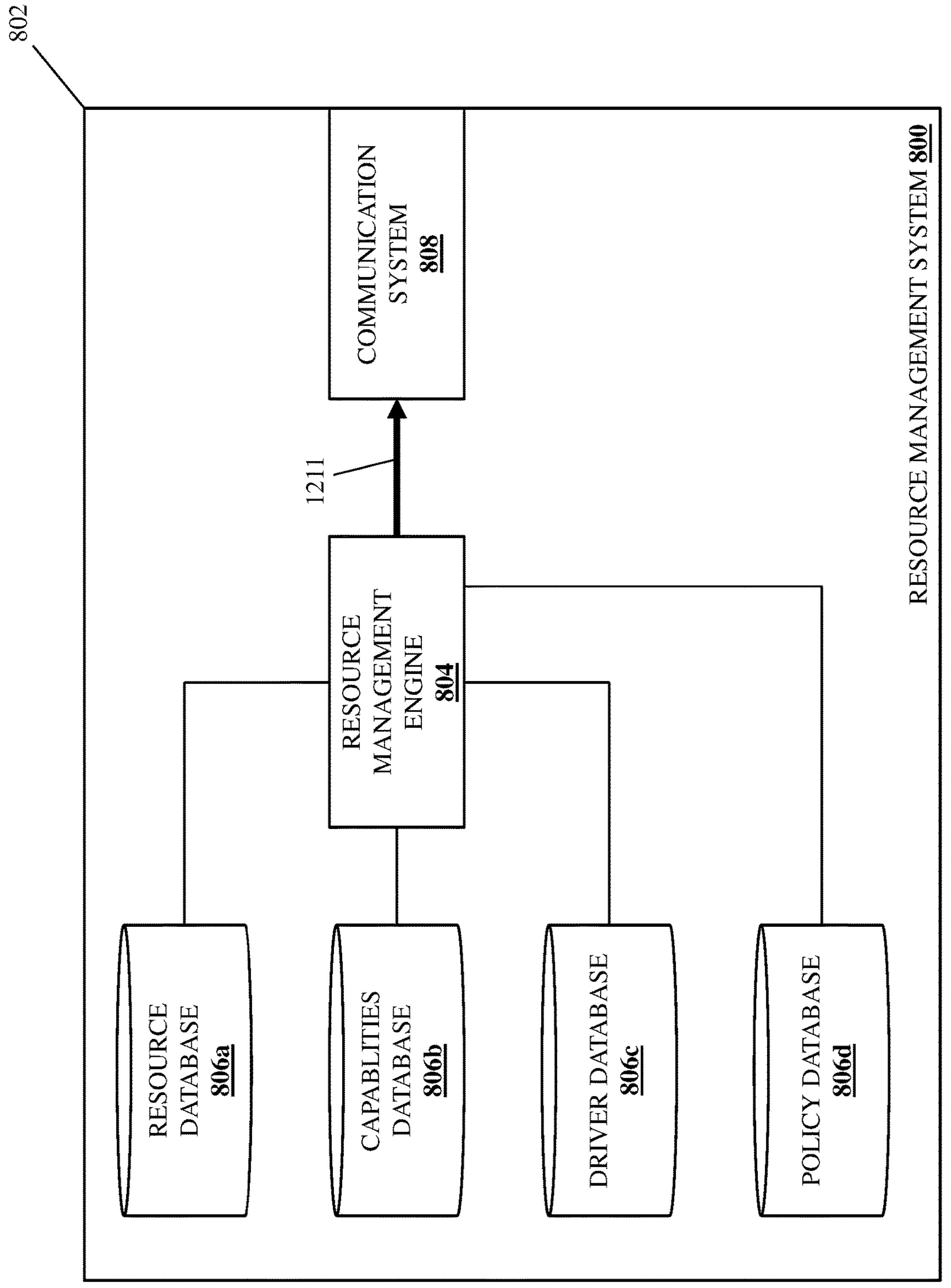
FIG. 12B is a schematic view illustrating an embodiment of the resource management system of FIG. 8 operating during the method of FIG. 9.
Figure 12C:
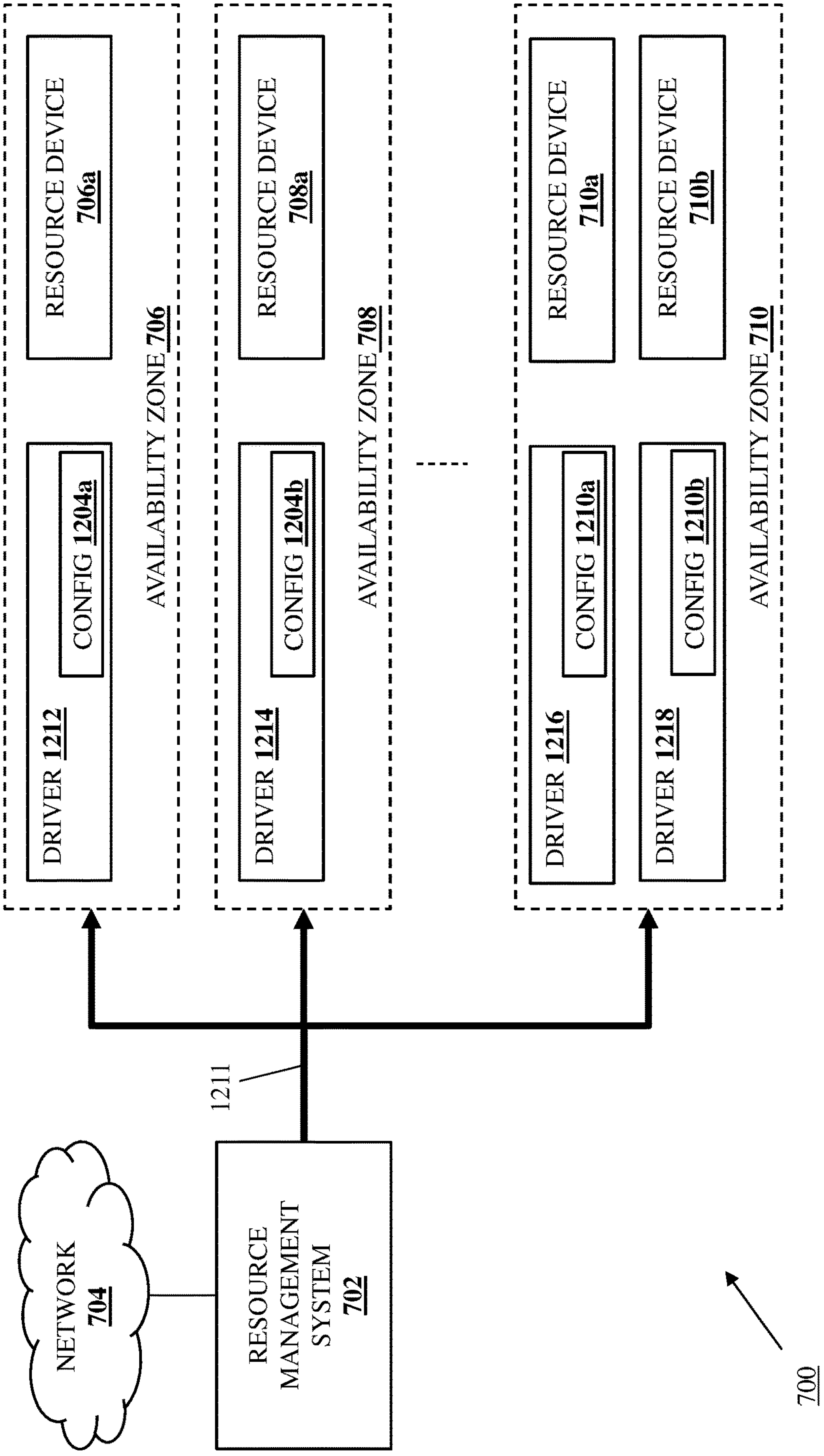
FIG. 12C is a schematic view illustrating an embodiment of the LCS provisioning subsystem of FIG. 7 operating during the method of FIG. 9.

As such, in an embodiment of block 912 and continuing with the example illustrated in FIGS. 12B and 12C, the resource management engine 804 in the resource management system 702/800 may perform driver provisioning operations 1211 via its communication system 808 that include providing a driver 1212 for the resource device 706*a* that includes a configuration 1204*a* that is provided by the one of the subsets of driver configuration information that as discussed above may be included in the LCS configuration information 1204 that was generated for the LCS 1200. Similarly, the driver provisioning operations 1211 may also include providing a driver 1214 for the resource device 708*a* that includes a configuration 1204*a* that is provided by the one of the subsets of driver configuration information that as discussed above may be included in the LCS configuration information 1204 that was generated for the LCS 1200. As will be appreciated by one of skill in the art in possession of the present disclosure, the provisioning of the drivers 1212 and 1214 may include the resource management engine 804 causing the drivers 1212 and 1214 to load the configurations 1204*a* and 1204*b*, respectively, in place of their driver configuration information described above that is configured to enable any capabilities available from their resource devices 706*a* and 708*a*, respectively. As such, FIG. 12C illustrates how the LCS 1200 of FIG. 12A may be provided by the resource devices 1202 that include resource devices 706*a* and 708*a* that have their capabilities limited via configurations 1204*a* and 1204*b* for their respective drivers 1212 and 1214. Thus, the drivers 1212 and 1214 may be provided to only enable capabilities that are required to provide the LCS 1200 and allowed for that LCS (or the user/tenant/client device that requested that LCS) per one or more policies, reducing security issues/attack vectors and associated security-related complexity in providing the LCS 1200.

Similarly, the driver provisioning operations 1211 may also include providing a driver 1216 for the resource device 710*a* that includes a configuration 1210*a* that is provided by the one of the subsets of driver configuration information that as discussed above may be included in the LCS configuration information 1210 that was generated for the LCS 1206, and providing a driver 1218 for the resource device 710*b* that includes a configuration 1210*b* that is provided by the one of the subsets of driver configuration information that as discussed above may be included in the LCS configuration information 1210 that was generated for the LCS 1206. As will be appreciated by one of skill in the art in possession of the present disclosure, the provisioning of the drivers 1216 and 1218 may include the resource management engine 804 causing the drivers 1216 and 1218 to load the configurations 1210*a* and 1210*b*, respectively, in place of their driver configuration information described above that is configured to enable any capabilities available from their resource devices 710*a* and 710*b*, respectively. As such, FIG. 12C illustrates how the LCS 1206 of FIG. 12A may be provided by the resource devices 1208 that include resource devices 710*a* and 710*b* that have their capabilities limited via configurations 1210*a* and 1210*b* for their respective drivers 1216 and 1218. Thus, the drivers 1216 and 1218 may be provided to only enable capabilities that are required to provide the LCS 1206 and allowed for that LCS (or the user/tenant/client device that requested that LCS) per one or more policies, reducing security issues/attack vectors and associated security-related complexity in providing the LCS 1206.

To provide a specific example, the LCS 1200 may require a storage system with a first storage device that provides block storage and a second storage device that provides object storage. As such, at block 904 the resource devices 706*a* and 708*a* may be identified for the LCS 1200 that are each provided by respective storage devices that includes both block storage capabilities and object storage capabilities. At block 908, the driver 1212 may be determined to be required for the storage device/resource device 706*a*, the driver 1214 may be determined to be required for the storage device/resource device 708*a*, and as discussed above those drivers 1212 and 1214 may include driver configuration information that is configured to enable both the block storage capabilities and object storage capabilities for the storage device/resource device 706*a* and storage device/resource device 708*a*, respectively.

However, at block 910 the LCS configuration information 1204 may be generated for the LCS 1200 that includes a subset of driver configuration information for the driver 1212 that is only configured to enable the block storage capabilities for the storage device/resource device 706*a*, and that driver 1212 may then be provided for the storage device/resource device 706*a* with a configuration provided by that subset of driver configuration information. Similarly, at block 910 the LCS configuration information 1204 may be generated for the LCS 1200 that includes a subset of driver configuration information for the driver 1214 that is only configured to enable the object storage capabilities for the storage device/resource device 708*a*, and that driver 1214 may then be provided for the storage device/resource device 708*a* with a configuration provided by that subset of driver configuration information. As such, subsequent operation of the storage device/resource device 706*a* will only allow block storage using that storage device/resource device 706*a*, and subsequent operation of the storage device/resource device 708*a* will only allow object storage using that storage device/resource device 708*a*.

As will be appreciated by one of skill in the art in possession of the present disclosure, the resource device capabilities configuration described above provide many benefits in the provisioning of LCSs. For example, such resource device capabilities configuration operations may allow for the provisioning of relatively “lightweight” drivers (e.g., the driver provided for the storage device that only enables block storage capabilities for that storage device as described above may only require read/write primitives). Furthermore, such resource device capabilities configuration operations may also reduce security issues/attack vectors and/or security-related complexity (e.g., the provisioning of driver that enables the “snapshot” capabilities described above only to the storage device(s) that require such capabilities may limit the security issues/attack vectors associated with such capabilities to that driver/storage device, and may only require that driver and its storage device(s) to be enabled with security capabilities to address those security issues/attack vectors).

Similarly, resource devices may be configured via the capability-limiting configurations of their drivers discussed above to allow a user or tenant of the LCS 1200 to create (or be prevented from creating) storage volumes in storage device(s) that provide the resource devices 706*a* and 708*a*, to allow a user or tenant of the LCS 1200 to delete (or be prevented from deleting) storage volumes in storage device(s) that provide the resource devices 706*a* and 708*a*, to allow a user or tenant of the LCS 1200 to partition (or be prevented from partitioning) processing device(s) that provide the resource devices 706*a* and 708*a*, to allow a user or tenant of the LCS 1200 to delete (or be prevented from deleting) partitions in processing device(s) that provide the resource devices 706*a* and 708*a*, to allow a user or tenant of the LCS 1200 to allocate (or be prevented from allocating) memory in memory device(s) that provide the resource devices 706*a* and 708*a*, to allow a user or tenant of the LCS 1200 to delete (or be prevented from deleting) past measurements in the resource devices 706*a* and 708*a*, and/or to configure capabilities available from the resource devices that provide the LCS 1200 in any of a variety of other manners that one of skill in the art in possession of the present disclosure will recognize as falling within the scope of the present disclosure as well.

Thus, systems and methods have been described that provide for the configuration of capabilities of resource devices used to provide an LCS in order to limit the capabilities of those resource devices to only those required for a workload that LCS will perform. For example, the workload-intent-based LCS resource capability configuration system of the present disclosure may include a resource management system coupled to resource devices. The resource management system receives a request to provide an LCS that includes workload intent identifying requirements of a workload the LCS will perform, and identifies a subset of the resource devices for providing the LCS to perform the workload. The resource management system then determines resource capabilities required from the subset of the resource devices to satisfy the workload intent, determines driver(s) required for the subset of the resource devices, and provides configuration information for driver(s) that is configured to limit driver-enabled capabilities available from the driver(s) for the subset of the resource devices to the resource capabilities required from the subset of the resource devices to satisfy the workload intent. The resource management system then provides the driver(s) for the subset of the resource devices. As such, unutilized capabilities, capabilities that can introduce security issues and attack vectors, and/or other resource device capabilities may be configured to be unavailable to an LCS based on the requirements of the workload that LCS will perform, policies associated with that LCS or the user/tenant/client device that requested that LCS, and/or other factor that would be apparent to one of skill in the art in possession of the present disclosure.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A workload-intent-based Logically Composed System (LCS) resource capability configuration system, comprising:
- a plurality of resource devices; and
- a resource management system that is coupled to the plurality of resource devices and that is configured to:
  - receive a request to provide a Logically Composed System (LCS) that includes workload intent identifying requirements of a workload that the LCS will perform;
  - identify a subset of the plurality of resource devices for providing the LCS to perform the workload;
  - determine resource capabilities required from the subset of the plurality of resource devices to satisfy the workload intent;
  - determine at least one driver required for the subset of the plurality of resource devices;
  - determine, from a plurality of driver-enabled capabilities that the at least one driver is capable of enabling, a first subset of the plurality of driver-enabled capabilities that are required from the subset of the plurality of resource devices to satisfy the workload intent, and a second subset of the plurality of driver-enabled capabilities that are not required from the subset of the plurality of resource devices to satisfy the workload intent;
  - provide capability-limiting configuration information for the at least one driver that is configured to cause the at least one driver to enable the first subset of driver-enabled capabilities for the LCS while making the second subset of driver-enabled capabilities unavailable to the LCS; and
  - provide the at least one driver for the subset of the plurality of resource devices.

2. The system of claim 1, wherein the subset of the plurality of resource devices includes at least one storage device, and wherein the at least one driver includes a Container Storage Interface (CSI) driver.

3. The system of claim 2, wherein the resource capabilities required from the subset of the plurality of resource devices to satisfy the workload intent include creating storage volumes, and do not include deleting storage volumes.

4. The system of claim 1, wherein the resource management system is configured to:
- determine that the resource capabilities required from the subset of the plurality of resource devices to satisfy the workload intent comply with a user policy for a user from which the request to provide the LCS was received.

5. The system of claim 1, wherein the providing the configuration information for the at least one driver includes generating LCS configuration information that will configure the LCS to satisfy the workload intent, and matching subsets of the LCS configuration information to each of the at least one driver.

6. The system of claim 1, wherein the plurality of resource devices are included in different availability zones.

7. An Information Handling System (IHS), comprising:
- a processing system; and
- a memory system that is coupled to the processing system and that includes instructions that, when executed by the processing system, cause the processing system to provide a resource management engine that is configured to:
  - receive a request to provide a Logically Composed System (LCS) that includes workload intent identifying requirements of a workload that the LCS will perform;
  - identify a subset of a plurality of resource devices that are coupled to the processing system for providing the LCS to perform the workload;
  - determine resource capabilities required from the subset of the plurality of resource devices to satisfy the workload intent;
  - determine at least one driver required for the subset of the plurality of resource devices;
  - determine, from a plurality of driver-enabled capabilities that the at least one driver is capable of enabling, a first subset of the plurality of driver-enabled capabilities that are required from the subset of the plurality of resource devices to satisfy the workload intent, and a second subset of the plurality of driver-enabled capabilities that are not required from the subset of the plurality of resource devices to satisfy the workload intent;
  - provide capability-limiting configuration information for the at least one driver that is configured to cause the at least one driver to enable the first subset of driver-enabled capabilities for the LCS while making the second subset of driver-enabled capabilities unavailable to the LCS; and
  - provide the at least one driver for the subset of the plurality of resource devices.

8. The IHS of claim 7, wherein the subset of the plurality of resource devices includes at least one storage device, and wherein the at least one driver includes a Container Storage Interface (CSI) driver.

9. The IHS of claim 8, wherein the resource capabilities required from the subset of the plurality of resource devices to satisfy the workload intent include creating storage volumes, and do not include deleting storage volumes.

10. The IHS of claim 7, wherein the resource management engine is configured to:
- determine that the resource capabilities required from the subset of the plurality of resource devices to satisfy the workload intent comply with a user policy for a user from which the request to provide the LCS was received.

11. The IHS of claim 7, wherein the providing the configuration information for the at least one driver includes generating LCS configuration information that will configure the LCS to satisfy the workload intent, and matching subsets of the LCS configuration information to each of the at least one driver.

12. The IHS of claim 7, wherein the plurality of resource devices are included in different availability zones.

13. The IHS of claim 7, wherein the plurality of resource devices are included in the same availability zones.

14. A method for configuring resource capabilities for a Logically Composed System (LCS) based on a workload intent for that LCS, comprising:
- receiving, by a resource management subsystem, a request to provide a Logically Composed System (LCS) that includes workload intent identifying requirements of a workload that the LCS will perform;
- identifying, by the resource management subsystem, a subset of a plurality of resource devices for providing the LCS to perform the workload;
- determining, by the resource management subsystem, resource capabilities required from the subset of the plurality of resource devices to satisfy the workload intent;
- determining, by the resource management subsystem, at least one driver required for the subset of the plurality of resource devices;
- determining, by the resource management subsystem from a plurality of driver-enabled capabilities that the at least one driver is capable of enabling, a first subset of the plurality of driver-enabled capabilities that are required from the subset of the plurality of resource devices to satisfy the workload intent, and a second subset of the plurality of driver-enabled capabilities that are not required from the subset of the plurality of resource devices to satisfy the workload intent;
- providing, by the resource management subsystem, capability-limiting configuration information for the at least one driver that is configured to cause the at least one driver to enable the first subset of driver-enabled capabilities for the LCS while making the second subset of driver-enabled capabilities unavailable to the LCS; and
- providing, by the resource management subsystem, the at least one driver for the subset of the plurality of resource devices.

15. The method of claim 14, wherein the subset of the plurality of resource devices includes at least one storage device, and wherein the at least one driver includes a Container Storage Interface (CSI) driver.

16. The method of claim 15, wherein the resource capabilities required from the subset of the plurality of resource devices to satisfy the workload intent include creating storage volumes, and do not include deleting storage volumes.

17. The method of claim 14, further comprising:
- determining, by the resource management subsystem, that the resource capabilities required from the subset of the plurality of resource devices to satisfy the workload intent comply with a user policy for a user from which the request to provide the LCS was received.

18. The method of claim 14, wherein the providing the configuration information for the at least one driver includes generating LCS configuration information that will configure the LCS to satisfy the workload intent, and matching subsets of the LCS configuration information to each of the at least one driver.

19. The method of claim 14, wherein the plurality of resource devices are included in different availability zones.

20. The method of claim 14, wherein the plurality of resource devices are included in the same availability zones.

* * * * *